US006494784B1

(12) United States Patent
Matsuyama et al.

(10) Patent No.: US 6,494,784 B1
(45) Date of Patent: *Dec. 17, 2002

(54) DRIVING GAME MACHINE AND A STORAGE MEDIUM FOR STORING A DRIVING GAME PROGRAM

(75) Inventors: Shigenobu Matsuyama, Kobe (JP); Shozo Fukunaga, Himeji (JP); Toru Mizumoto, Kobe (JP); Akihiro Shimizu, Nagoya (JP)

(73) Assignee: Konami Corporation, Hyogo-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/572,159

(22) Filed: May 17, 2000

Related U.S. Application Data

(63) Continuation of application No. 08/908,618, filed on Aug. 7, 1997, now Pat. No. 6,117,007.

(30) Foreign Application Priority Data

Aug. 9, 1996 (JP) .............................................. 8-211786

(51) Int. Cl.[7] ................................................ A63F 13/00
(52) U.S. Cl. ............................... 463/6; 463/32; 463/33; 434/62
(58) Field of Search ....................... 463/6, 7, 15, 32–34, 463/36, 38, 43; 434/62–66, 68–71

(56) References Cited

U.S. PATENT DOCUMENTS

| 4,958,835 A | * | 9/1990 | Tashiro et al. ............... 273/460 |
| 5,240,417 A | * | 8/1993 | Smithson et al. ........... 348/121 |
| 5,299,810 A | * | 4/1994 | Pierce et al. ................ 273/442 |
| 5,354,202 A | * | 10/1994 | Moncrief et al. ........... 273/454 |
| 5,522,019 A | * | 5/1996 | Bala et al. ................... 345/419 |
| 5,577,913 A | * | 11/1996 | Moncrief et al. ........... 273/454 |
| 5,755,620 A | * | 5/1998 | Yamamoto et al. ............ 463/34 |

FOREIGN PATENT DOCUMENTS

| DE | 41 26 495 | | 2/1993 |
| EP | 0423934 | * | 9/1990 |
| EP | 0 423 934 | | 4/1991 |
| EP | 0579451 | * | 7/1993 |
| EP | 0 579 451 | | 1/1994 |
| EP | 0787516 | * | 8/1997 |
| EP | 0 787 516 | | 8/1997 |
| JP | 58-98772 | | 6/1983 |
| JP | 06-142339 | | 5/1994 |
| JP | 06-165880 | | 6/1994 |
| JP | 07-088257 | | 4/1995 |
| JP | 07-155462 | | 6/1995 |
| WO | WO 83/04121 | * | 11/1983 |
| WO | 83/04121 | | 11/1983 |

* cited by examiner

Primary Examiner—Valencia Martin-Wallace
Assistant Examiner—John M Hotaling, II
(74) Attorney, Agent, or Firm—Jordan and Hamburg LLP

(57) ABSTRACT

A driving game machine provided with a road data memory for storing coordinate data of a road set in a game space, a player's car controller for controlling the running of a player's car on the road according to a player's operation, and a display processor for displaying an image within a field of view set in advance. The road has a start point and a goal point, a running course from the start point to the goal point has a plurality of branched roads in its intermediate positions. The player's car controller causes the player's car to run in a direction selected at each branching point in accordance with a player's operation. This makes it possible for a player to freely choose the course while competing with his rivals.

12 Claims, 16 Drawing Sheets

WORLD COORDINATE
SYSTEM

LOCAL COORDINATE
SYSTEM

DRIVING GAME MACHINE AND A STORAGE MEDIUM FOR STORING A DRIVING GAME PROGRAM

This application is a continuation of application Ser. No. 08/908,618 filed Aug. 7, 1997 now U.S. Pat. No. 6,117,007.

BACKGROUND OF THE INVENTION

This invention relates to a driving game machine for displaying a three-dimensional image which changes when a car is simulatively driven by the operation of a player on a display monitor in real time and also to a storage medium for storing such a driving game program.

Driving game machines in which a player seats on a seat provided with an operation unit including a steering wheel, an accelerator pedal, a brake pedal and the like as in a driver's seat of an automotive vehicle and a car is simulatively driven within a screen by operating the operation unit while viewing a three-dimensional image displayed on the display monitor have been spread. In these driving game machines, on the road of the screen are displayed, in addition to a car driven by the player (hereinafter, "player's car"), computer-controlled rival cars which are competitors of the player's car, computer-controlled general cars (cars not participating in the race) which function as simple obstacles, and a communications car controlled by an other player in the case that a data communication with an other driving game machine is possible. The player enjoys the game by passing other cars by driving his car on a three-dimensionally configured road having curves and elevations at high speed.

However, among the conventional driving game machines, there is no such one with which a player can freely choose a running course between predetermined start and goal points. In other words, the respective cars run on a predetermined race track or on a predetermined course in a town. In some conventional driving game machines, the running course is merely preliminary provided with a route to enter a pit.

SUMMARY OF THE INVENTION

It is an object of the present invention to provide a driving game machine and a game program storage medium which have overcome the problems residing in the prior art.

According to an aspect of the present invention, a driving game machine comprises operation means for generating an operation signal in accordance with a player's operation; road data storage means for storing coordinate data of a road set in a game space; player's car control means for controlling the running of a player's car on the road in accordance with an operation signal from the operation means; and display processing means for displaying an image of the game space within a field of view set in advance. The road has a start point and a goal point, and a running course from the start point to the goal point is provided with a plurality of branched roads in its intermediate positions. The player's car control means causes the player's car to run in a direction selected by the player at each branching point which leads to one of the branched roads based on the operation signal from the operation means.

According to another aspect of the present invention, a driving game machine capable of affording a competition between a player's car and a rival car, the driving game machine comprises: operation means for generating an operation signal in accordance with a player's operation; road data storage means for storing coordinate data of a road set in a game space; player's car control means for controlling the running of a player's car on the road in accordance with an operation signal from the operation means; rival car control means for controlling the running of a rival car on the road; and display processing means for displaying an image of the game space within a field of view set in advance. The road has a start point and a goal point, and a running course from the start point to the goal point is provided with a plurality of branched roads in its intermediate positions. The player's car control means causes the player's car to run in a direction selected by the player at each branching point which leads to one of the branched roads based on the operation signal from the operation means.

According to still another aspect of the present invention, a driving game machine comprises: operation means for generating an operation signal in accordance with a player's operation; three-dimensional data storage means for storing coordinate data of a three-dimensional road which are set in a three-dimensional coordinate system within a game space; player's car control means for controlling the running of a player's car on the three-dimensional road in accordance with an operation signal from the operation means; general car control means for controlling the running of a plurality of general cars on the three-dimensional road; display processing means for displaying an image of the game space within a predetermined field of view by applying a three-dimensional image processing; and position determination means for determining a positional relationship between the player's car and the general cars, the position determination means determining the positional relationship using only two-dimensional coordinate data.

According to yet still another aspect of the present invention, a driving game machine for displaying an image changeable with simulative driving of a car on a road set within a game space on a display monitor in real time, comprises: road data storage means for storing coordinate data of the road; player's car control means for controlling the running of the player's car according to a player's operation; and map display processing means for displaying a map showing the entire road on the display monitor on the basis of the running direction of the player's car.

According to further aspect of the present invention, a driving game machine comprises: operation means including a steering wheel for changing the orientation of a car, an accelerator pedal for accelerating the car, a brake pedal for decelerating the car, and a side brake for locking the rear wheels of the car to generate an operation signal in accordance with player's operation of them; player's car control means for controlling the running of a player's car on a road set in a game space in accordance with an operation signal from the operation means. The player's car control means includes: steering wheel operated amount detection means for detecting an operated amount of the steering wheel; accelerator pedal operated amount detection means for detecting an operated amount of the accelerator pedal; brake pedal operated amount detection means for detecting an operated amount of the brake pedal; side brake operated amount detection means for detecting an operated amount of the side brake; car speed calculation means for calculating the car speed based on the detected operated amounts of the accelerator pedal and the brake pedal; and lock condition determination means for determining whether the lock condition is satisfied using the calculated car speed and the detected operated amount of the side brake; lock condition storage means for storing a predetermined lock condition under which the rear wheels are locked according to a car speed and an operated amount of the side brake; and display processing means for displaying an image corresponding to the running of the player's car by applying an image processing.

According to still further aspect of the present invention, a driving game machine for displaying an image which is changeable with simulative driving of a car on a road set within a game space on a display monitor in real time, comprises: operation means for generating an operation signal in accordance with a player's operation; road data storage means for storing coordinate data of the road; player's car control means for controlling the running of a player's car on the road in accordance with an operation signal from the operation means; rival car control means for controlling the running of a rival car on the road; display processing means for displaying an image of the game space within a predetermined field of view on the display monitor; contact determination means for determining whether the player's car and the rival car have contacted; and target display control means for displaying on the display monitor a target representation indicating that either one of the player's car and the rival car is target, the target display control means switching the target representation from one of the player's car and the rival car to the other when there is discriminated to be a contact between the player's car and the rival car.

According to yet still further aspect of the present invention, a driving game machine for displaying an image which is changeable with simulative driving of a car on a road set within a game space on a display monitor in real time, comprises: a plurality of operation units respectively provided for a plurality of players, each operation unit for generating an operation signal in accordance with a player's operation; road data storage means for storing coordinate data of the road; player's car control means for controlling the running of player's cars corresponding to the plurality of players on the road in accordance with operation signals from the plurality of operation units, respectively; display processing means for displaying an image of the game space within a predetermined field of view on the display monitor; contact determination means for determining whether player's cars have contacted to one another; and target display control means for displaying on the display monitor a target representation indicating that one of the player's cars is target, the target display control means switching the target representation from one of player's cars to another when there is discriminated to be a contact between player's cars.

According to yet still further aspect of the present invention, a computer readable storage medium storing a driving game program which render a computer to execute a procedure that a player's car simulatively runs on a road set within a game space in accordance with an operation signal from operation means operable by a player, and an image of the game space within a predetermined field of view is displayed on the display monitor, the road including a start point and a goal point which defines a running course which has a plurality of branched roads in intermediate positions thereof, the driving game program comprises: a control step of controlling the player's car to run at each branching point which leads to one of the branched roads in a direction in accordance with an operation signal from the operation means.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
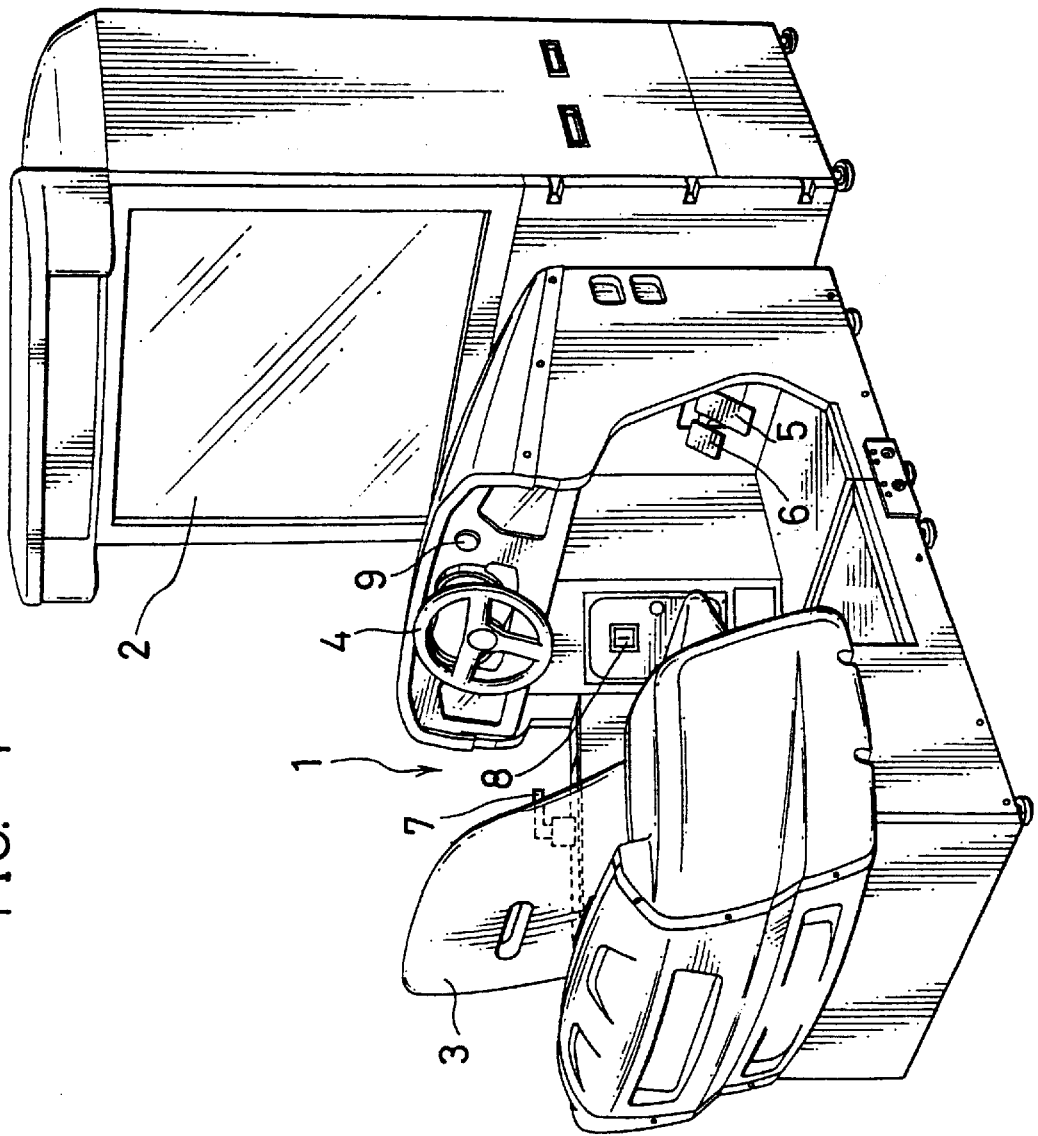
FIG. 1 is a perspective view showing an outer configuration of one embodiment of a driving game machine according to the present invention.
Figure 2:
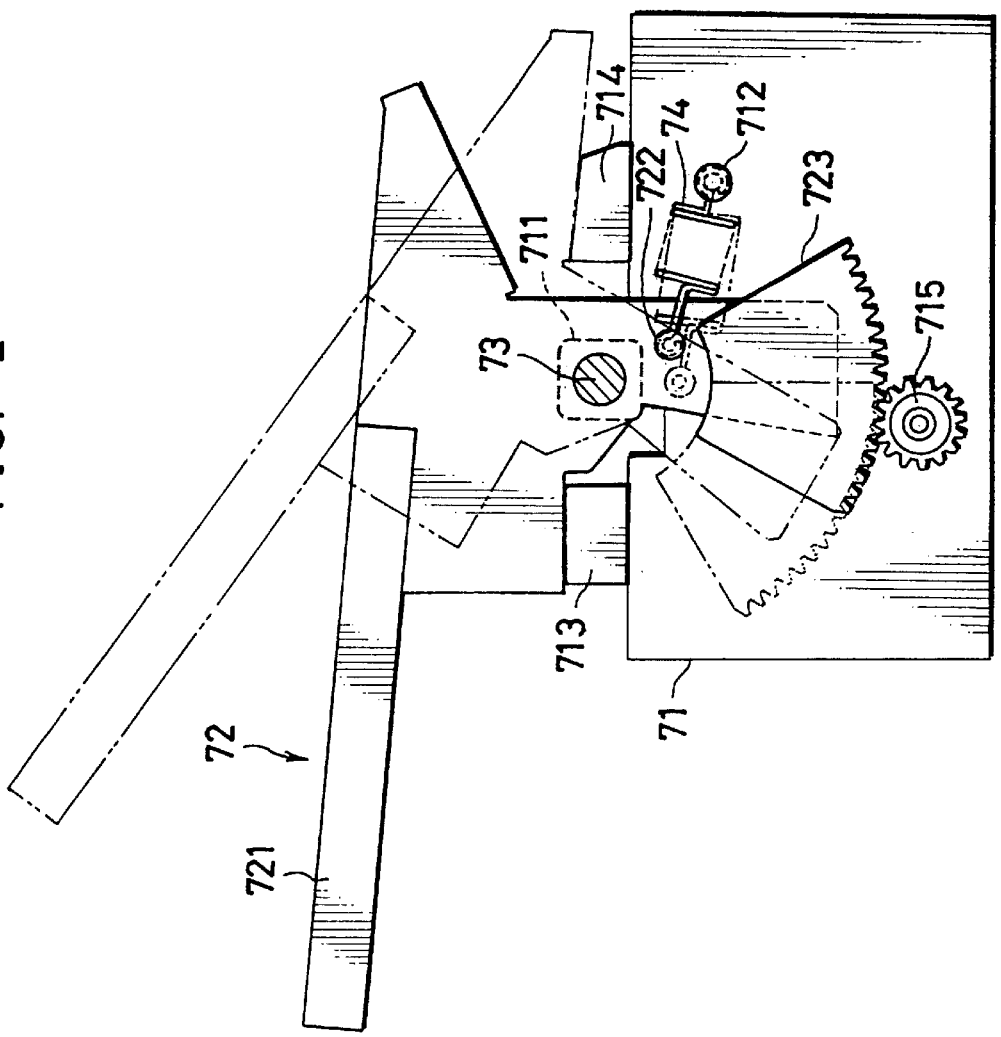
FIG. 2 is a construction diagram of a side brake of the driving game machine.

With reference to FIGS. 1 and 2, one embodiment of a driving game machine according to the invention will be described. FIG. 1 is a perspective view showing an external construction of this embodiment, and FIG. 2 is a construction diagram of a side brake.

The driving machine is, as shown in FIG. 1, provided with a driver's seat 1 and a display monitor 2. In the driver's seat 1, there are provided a seat 3, a steering wheel 4, an accelerator pedal 5, a brake pedal 6 and a side brake 7 similar to a driver's seat of an automotive vehicle. In the driver's seat 1, a coin slot 8 into which coins are inserted is arranged on the left side before the seat 3, and a start switch 9 for instructing the start of a game is arranged on the right side of the steering wheel 4. The display monitor 2 is arranged before the driver's seat 1 in such a position that it can be easily seen by a player seated on the seat 3 and is comprised of a CRT, LCD, projector or the like to display images.

The side brake 7 is, as shown in FIG. 2, provided with a support frame 71 and a brake lever 72. This support frame 71 is comprised of a bearing portion 711 provided substantially at a center upper end, a spring fixing portion 712 provided in the right half of its lower portion, stoppers 713, 714 provided at the left and right sides of the upper end, and a variable resistor 715 provided substantially at a center lower portion. The brake lever 72 is mounted on a rotatable shaft 73 provided in the bearing portion 711, and is rotatably supported on the rotatable shaft 73.

The brake lever 72 is substantially L-shaped, and is comprised of a lever portion 721 which is operated by being gripped by the player, a spring fixing portion 722 provided below a center of its rotation, and an operated amount transmitting portion 723 provided at a bottom end.

Between the spring fixing portions 712, 722 is provided a spring 74 for applying an elastic force in such a direction as to move them toward each other. Further, teeth formed on the outer circumferential surface of a rotary portion of the variable resistor 715 and those formed on the outer circumferential surface of the operated amount transmitting portion 723 are in mesh with each other so as to transmit the rotation of the brake lever 72 to the variable resistor 715.

When not being operated, the brake lever 72 is biased counterclockwise in FIG. 2 by the spring 74 and, as indicated by solid line, a left bottom end of the lever portion 721 is in contact with the stopper 713, thereby stopping the brake lever 72.

On the other hand, when the player operates the brake lever 72 to rotate it clockwise in FIG. 2, the variable resistor 715 rotates according to an operated amount, thereby varying a resistance value thereof. In a position where a right bottom end of the lever portion 721 is in contact with the stopper 714, the operated amount of the brake lever 72 is 100 percent (phantom line in FIG. 2).

This side brake 7 is also provided with an unillustrated voltage converter for converting the resistance value of the variable resistor 715 into a voltage of corresponding level which is then sent to a controller 25 to be described later.

Figure 3:
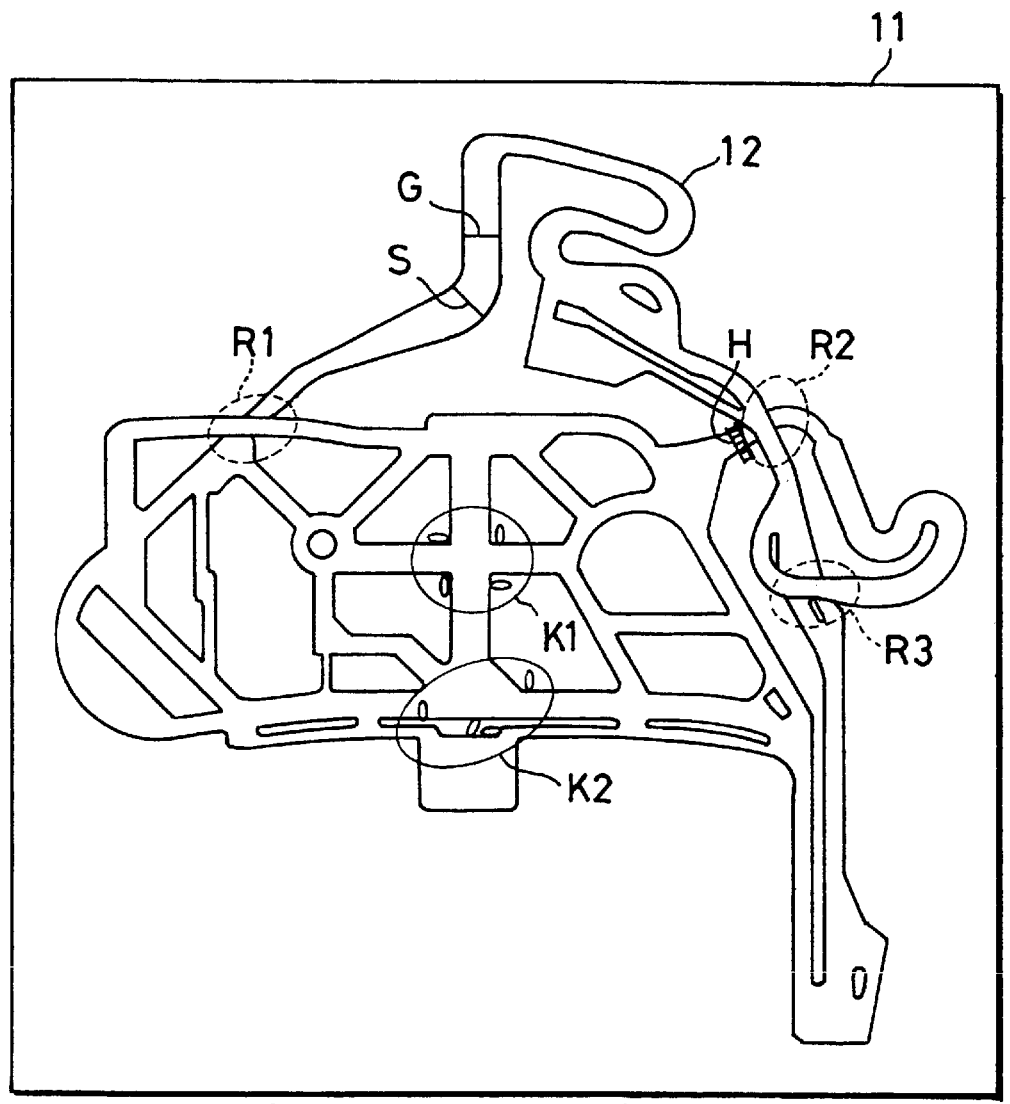
FIG. 3 is a diagrammatic representation of a field of a driving game performed in the game machine.
Figure 3:
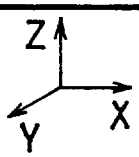
Figure 3:
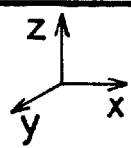
Figure 4:
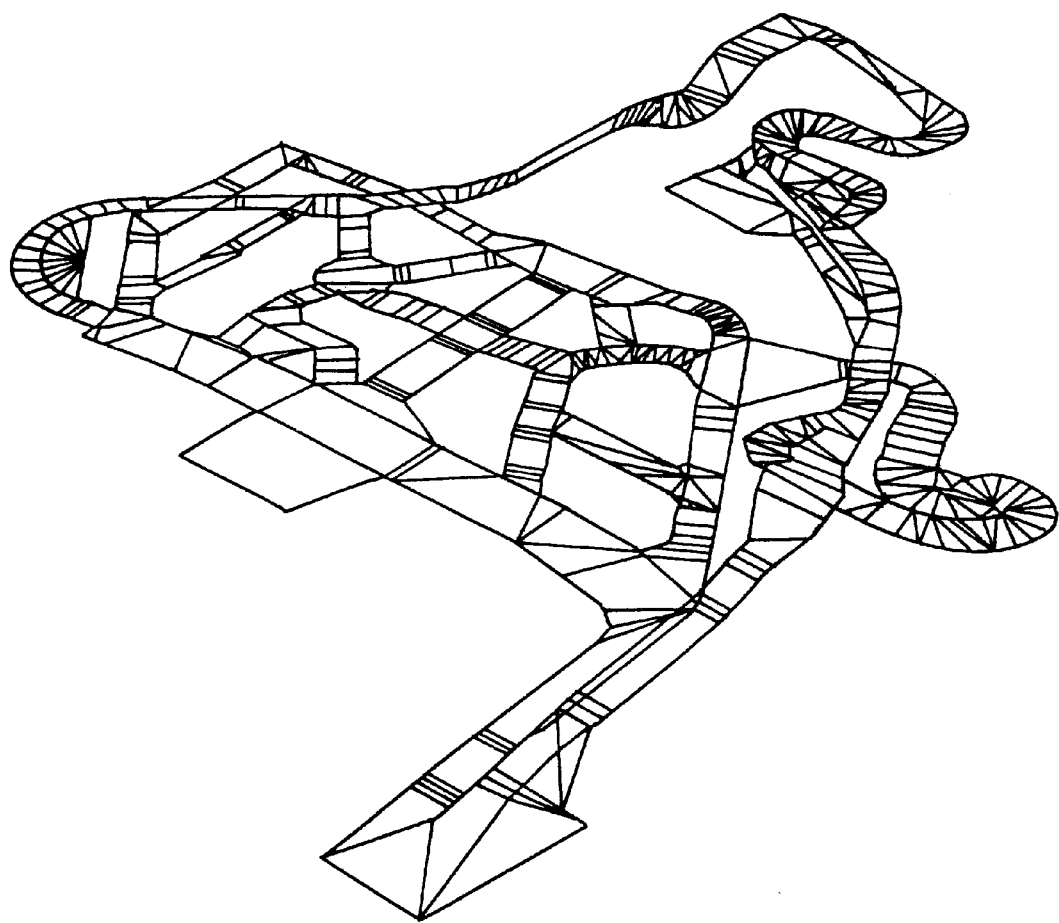
FIG. 4 is a diagram showing a course map.
Figure 5:
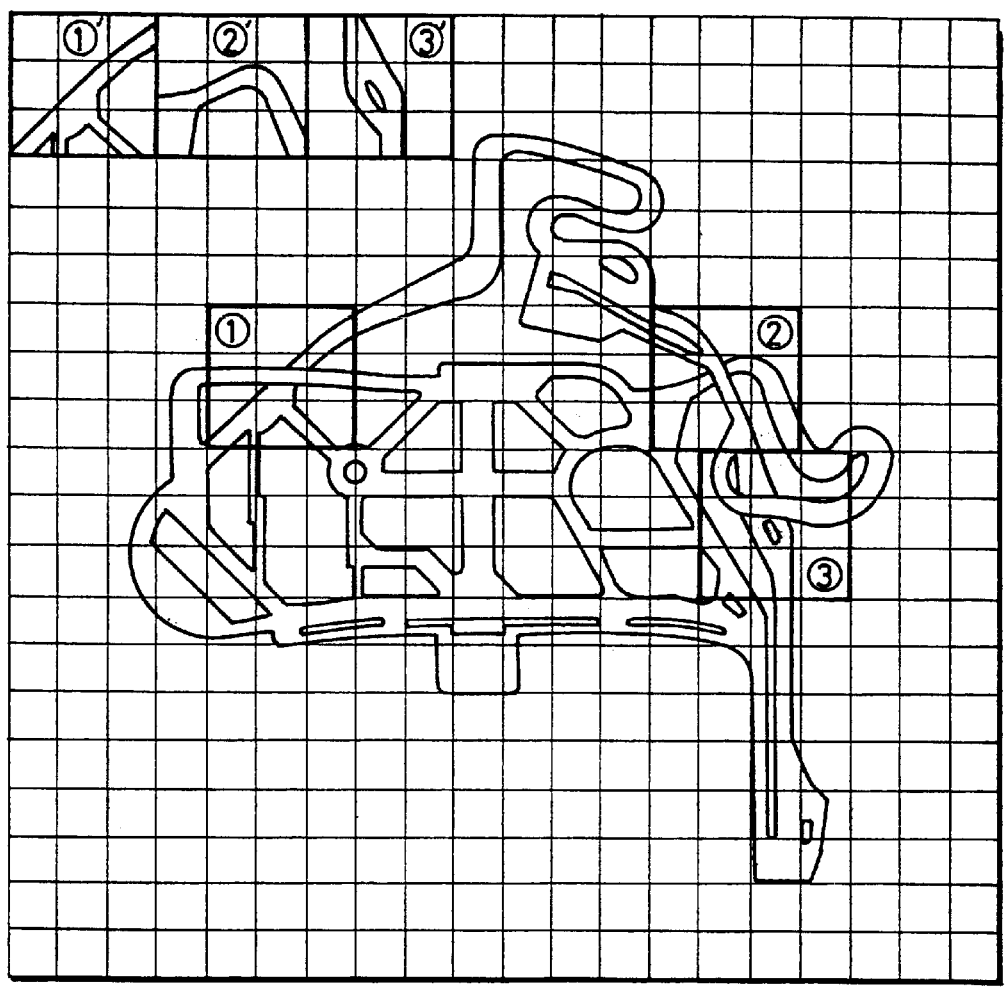
FIG. 5 is a diagram showing the generation of coordinate data of the road.

Next, with reference to FIGS. 3 to 5, coordinate systems used for image processing of the game performed according to this embodiment and the driving game are summarily described.

FIG. 3 is a diagram showing a field of the driving game performed by this game machine; FIG. 4 is a diagram of a course map; and FIG. 5 is a diagram showing how a coordinate data of road 12 of a town is generated.

A field 11 of FIG. 3 shows an entire space expressed using a computer graphics image. This field 11 includes the road 12 which serves as a driving course and unillustrated models such as buildings built along the road 12, i.e., individual objects displayed on a computer graphics screen.

The road 12 includes predetermined starting point S and goal point G, two-level crossings R1, R2, R3 and traffic lights provided at an intersection (branching point) K1 in the center and an intersection K2 below the intersection K1, and a railroad crossing H provided near the two-level crossing R2.

Three-dimensional world coordinate systems (X, Y, Z) shown in FIG. 3 are coordinate systems set in the field 11, and the road 12 is expressed using the world coordinate systems (X, Y, Z). Further, three-dimensional local coordinate systems (x, y, z) are coordinate systems set in a partial space within the field 11. An information on the configuration and positions of the models such as buildings is expressed using the local coordinate systems (x, y, z) peculiar thereto.

In this game machine, as shown in FIG. 4, a course map in which the road 12 is expressed by a two-dimensional coordinate data is displayed on the display monitor 2. In FIG. 4, a triangle or rectangle enclosed by straight lines constructs one polygonal plane.

Further, the coordinate data of the road 12 are generated by dividing the entire field 11 of 640 m×640 m into blocks of 32 m×32 m using a center point as an origin as shown in FIG. 5.

General driving control and collision discrimination to be described later are performed using only a two-dimensional coordinate data (X, Y) so as to conduct a calculation at a higher speed. Thus, when a car enter the block ①, ②, or ③ including the two-level crossing R1, R2, or R3 (see FIG. 3), it is discriminated whether the car is running on overpass or underpass road by comparing a Z-coordinate data with a predetermined value. In the case that the car is discriminated to be running on the underpass, the block ①', ②', or ③' in which the underpass data is expressed is set. When the car passes this block, blocks adjacent thereto are set.

By separately setting the blocks ①, ②, or ③ and the blocks ①', ②', or ③', calculations can be performed within a short time using the two-dimensional data although the road 12 is a three-dimensional road including the two-level crossings. This reduces a load on the CPU and securely enables the images to be displayed on the display monitor 2 in real time.

The game performed in this driving game machine is such that in the road 12 where general cars which function as obstacles run and, pedestrians walk along sidewalks, the player starts his car from the starting point simultaneously with rival cars controlled by the CPU and drives it without colliding with the both sides of the road and general cars while passing the general cars ahead, thereby competing with the rival cars to reach the goal point faster.

In this game, there are set a plurality of check points in the road 12 between the starting point S and the goal point G. The car operated by the player needs to pass the respective check points within predetermined times, but no particular driving courses are set between the check points, so that the player can freely choose a driving direction at each intersection or branching point. It should be noted that short-distance courses are not necessary advantageous because a multitude of general cars may be set to crowd the road in the short-distance courses and the road may be fairly empty in long-distance courses.

In this game machine, several tens of general cars and several rival cars are set, and the models such as buildings near the road 12, the general cars and the rival cars which are located within a field of the player's vision are displayed on the display monitor 2 according to the position and orientation of the player's car. In this way, since the road 12 is set as a driving course and the driving direction can be freely chosen at each intersection or branching point, the driving game can be made more complicated, and the player is requested to have a better driving manner and able to feel more as if he were actually driving.

Figure 6:
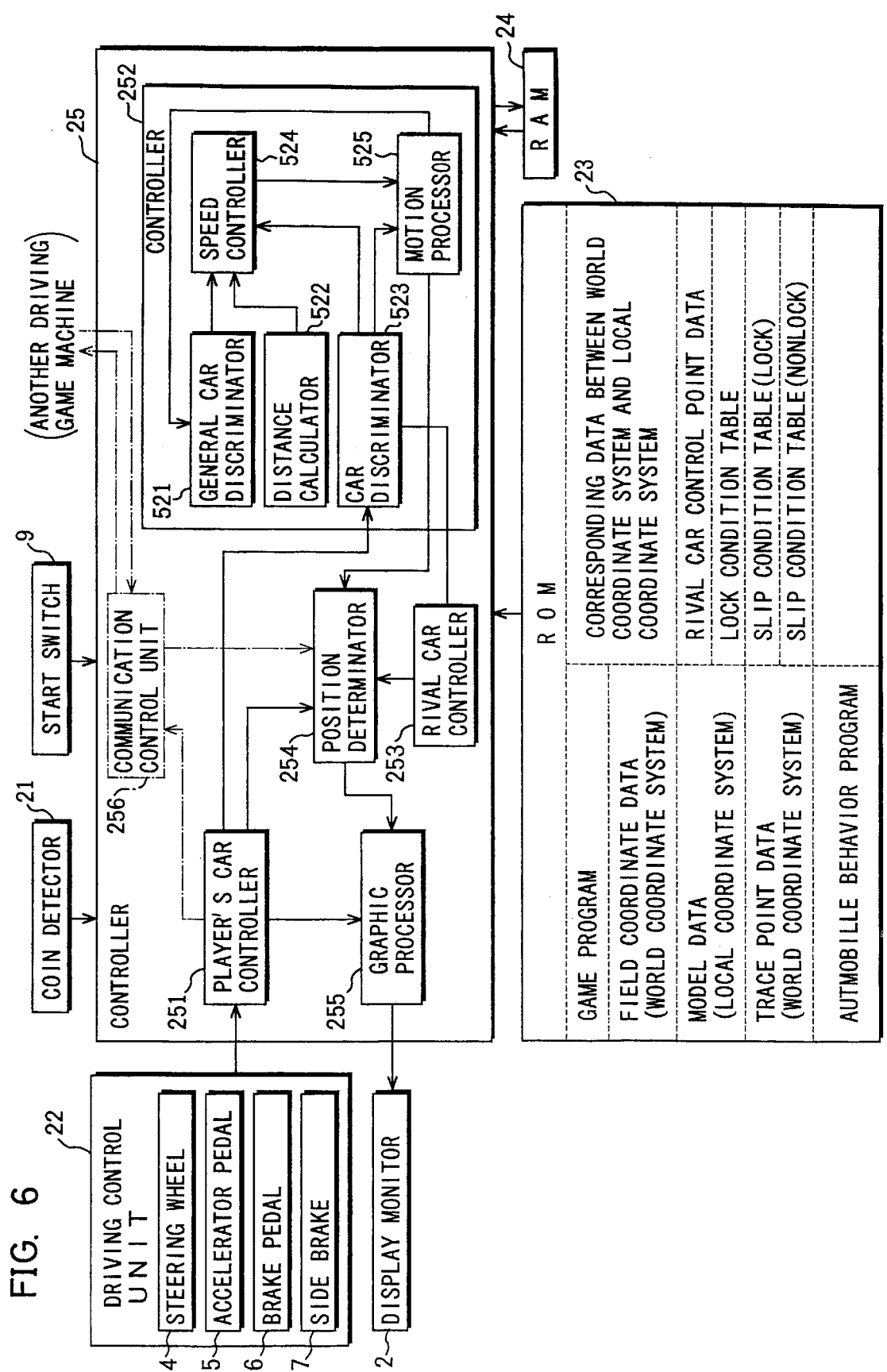
FIG. 6 is a block diagram showing a control system of the driving game machine.
Figure 7:
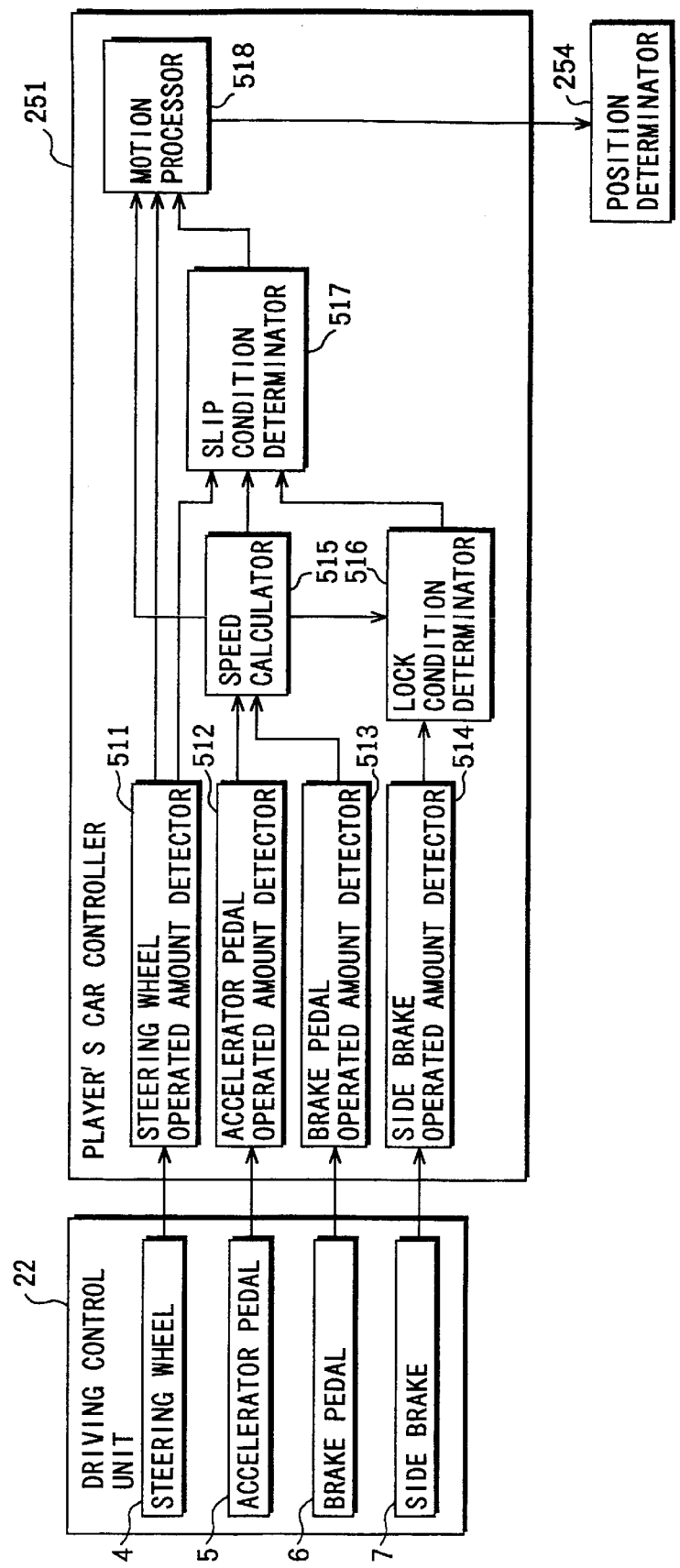
FIG. 7 is a block diagram showing a construction of a player's car controller.
Figure 8:
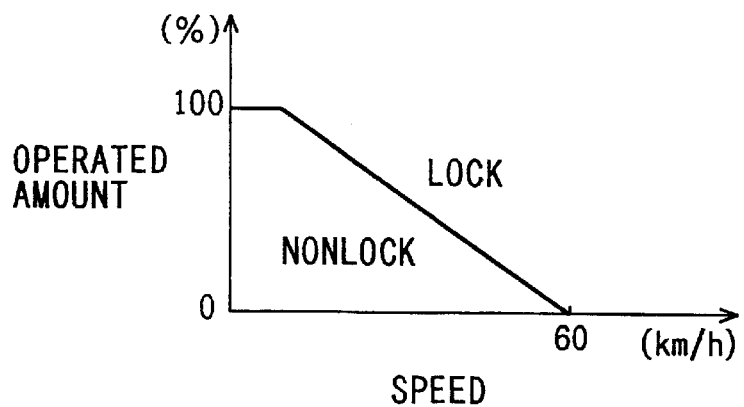
FIG. 8 is a graph showing a lock condition.
Figure 9:
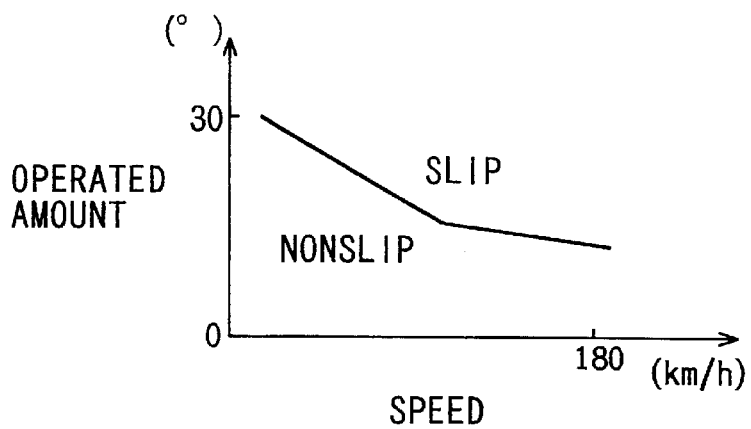
FIG. 9 is a graph showing a slip condition when rear wheels are not locked.
Figure 10:
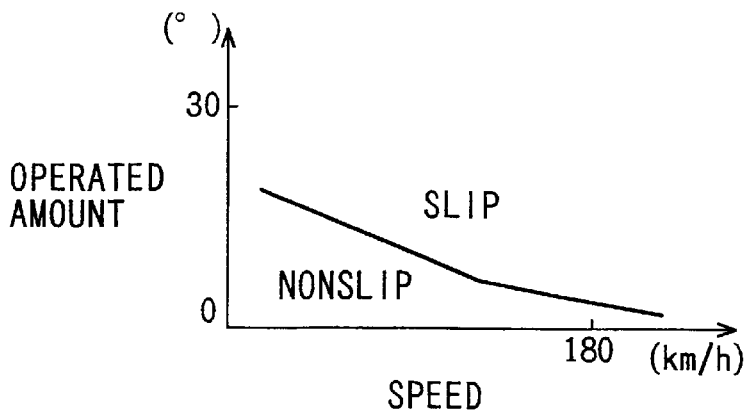
FIG. 10 is a graph showing the slip condition when the rear wheels are locked.

FIG. 6 is a block diagram showing a control system according to this embodiment; FIG. 7 is a block construction diagram of a player's car controller 251; FIG. 8 is a graph showing a lock condition; FIGS. 9 and 10 are graphs showing a slip condition when the rear wheels of the car are not locked and a slip condition when they are locked, respectively.

This control system includes, as shown in FIG. 6, the display monitor 2, the start switch 9, a coin detector 21, a driving operation unit 22, a ROM 23, a RAM 24 and the controller 25. The controller 25 is comprised of a player's car controller 251, a general car controller 252, a rival car controller 253, a position determinator 254 and a graphic processor 255.

The player's car controller 251 is, as shown in FIG. 7, comprised of a steering wheel operated amount detector 511, an accelerator pedal operated amount detector 512, a brake pedal operated amount detector 513, a side brake pedal operated amount detector 514, a speed calculator 515, a lock condition determinator 516, a slip condition determinator 517 and a motion processor 518.

The general car controller 252 is, as shown in FIG. 6, comprised of a general car discriminator 521, a distance calculator 522, a car discriminator 523 for discriminating the player's car from the rival cars, a speed controller 524, and a motion processor 525.

In FIG. 6, the start switch 9 is operated by the player. When the start switch 9 is pressed by the player, a corresponding switch signal is sent to the controller 25. The coin detector 21 detects the coin inserted into the coin slot 8 (see FIG. 1) and its detection signal is sent to the controller 25.

The driving operation unit 22 includes the steering wheel 4, the accelerator pedal 5, the brake pedal 6 and the side brake 7. Respective operation data concerning the operated amounts of the respective elements 4 to 6, i.e., an angle of rotation of the steering wheel 4, degrees to which the accelerator pedal 5 and the brake pedal 6 are pressed are converted into voltages of corresponding levels similar to the side brake 7, and are sent to the steering wheel operated amount detector 511, the accelerator pedal operated amount detector 512, the brake pedal operated amount detector 513, and the side brake pedal operated amount detector 514 of the player's car controller 251 as shown in FIG. 7.

Referring back to FIG. 6, the ROM 23 is adapted to store a program of this driving game, the coordinate data of the field expressed by the world coordinate systems, the coordinate data of the respective models expressed by the local coordinate systems, a program concerning the motion of the car in accordance with automotive engineering, correspondence data between the world coordinate systems and the respective local coordinate systems, a lock condition table data and slip condition table data when the rear wheels are locked and when they are not locked.

The lock condition table data is a table data which defines a lock state of rear wheels of the car based on a predetermined relationship between the operated amount of the side brake 7 and the speed of the car as shown in FIG. 8. The slip condition table data when the rear wheels are not locked is a table data which defines a slipping state of the car when the rear wheels are not locked based on a predetermined relationship between the operated amount of the steering wheel 4 and the speed of the car as shown in FIG. 9. The slip condition table data when the rear wheels are locked is a table data which defines the slipping state of the car when the rear wheels are locked based on a predetermined relationship between the operated amount of the steering wheel 4 and the speed of the car as shown in FIG. 10.

The ROM 23 is adapted to store a trace point data expressed in the world coordinate systems and a rival car control point data which are to be described later. The RAM 24 is adapted to temporarily store the data or the like.

The controller 25 is constructed by a CPU, a logic circuit or the like, and is adapted to perform a variety of calculations in each specified sampling rate, control the operation of the respective elements using the calculation results, and display images on the display monitor 2. The controller 25 further discriminates the insertion of the coin into the coin slot 8 (see FIG. 1) based on whether it has received a detection signal from the coin detector 21, and discriminates whether the start switch 9 has been pressed by the player based on whether it has received a switch signal from the start switch 9.

Furthermore, the controller 25 executes a control to change the traffic lights to green, yellow and red in a specified cycle and a control to lower crossing gates of the railroad crossings at a specified timing.

The player's car controller 251 of the controller 25 controls the driving of the player's car using the operation data of the respective elements sent from the driving operation unit 22 and a car motion program in accordance with automotive engineering which is stored in the ROM 23.

In FIG. 7, the steering wheel operated amount detector 511, accelerator pedal operated amount detector 512, brake pedal operated amount detector 513 and side brake pedal operated amount detector 514 of the player's car controller 251 are each provided with an A/D converter and the like, and detect the operated amounts of the respective elements based on the operation data sent from the steering wheel 4, accelerator pedal 5, brake pedal 6 and side brake 7 of the driving operation unit 22.

The speed calculator 515 calculates the speed of the player's car using the detected operated amounts of the accelerator pedal 5 and the brake pedal 6. The lock condition determinator 516 determines whether the rear wheels are locked using the detected operated amount of the side brake 7, the calculated speed, and the lock condition table data stored in the ROM 23.

The slip condition determinator 517 determines whether the car is slipping using the detected operated amount of the steering wheel 4, the calculated speed, the determination results of the lock condition determinator 516 and the slip condition table data when the rear wheels are locked and when the rear wheels are not locked which are stored in the ROM 23.

The motion processor 518 performs a motion processing of the player's car using the detected operated amount of the steering wheel 4, the calculated speed, the determination result of the slip condition determinator 517, and the car motion program in accordance with automotive engineering which is stored in the ROM 23.

Here, influence by the side brake is described. The side brake which applies a braking force only to the rear wheels locks the rear wheels depending on a condition. Accordingly, in the player's car controller 251, the states of the rear wheels are divided into two states: lock state and nonlock state. Normally, the rear wheels are in the nonlock state. When the side brake 7 is operated to a greater degree than a specified level, the rear wheels are locked. This specified level is set according to the speed of the player's car as shown in FIG. 8.

On the other hand, the orientation of the running car can be changed by turning the steering wheel. When the steering wheel is turned to a larger degree, the car is capable of a small sharp turn. However, when the steering wheel is turned to a larger degree while the car is running at high speed, the tires lose a frictional force, thereby being brought into a slipping state. Accordingly, the player's car controller 251 performs the motion processing by means of calculations which are different when the car is slipping and when the car is not slipping using the car motion program in accordance with automotive engineering.

Whether or not the car is brought into the slipping state is set based on the operated amount of the steering wheel 4 and the speed of the car. When the rear wheels are locked, the car is immediately brought into the slipping state even if the operated amount of the steering wheel 4 is small. Accordingly, as shown in FIGS. 9 and 10, the condition of bringing the car into the slipping state is differed depending upon whether or not the rear wheels are locked.

The motion of the car in the slipping state is basically similar in the locked and nonlock states of the rear wheels. However, the steering wheel 4 has a higher response when the rear wheels are locked, so that the overall motion of the car can be made delicate.

Figure 11:
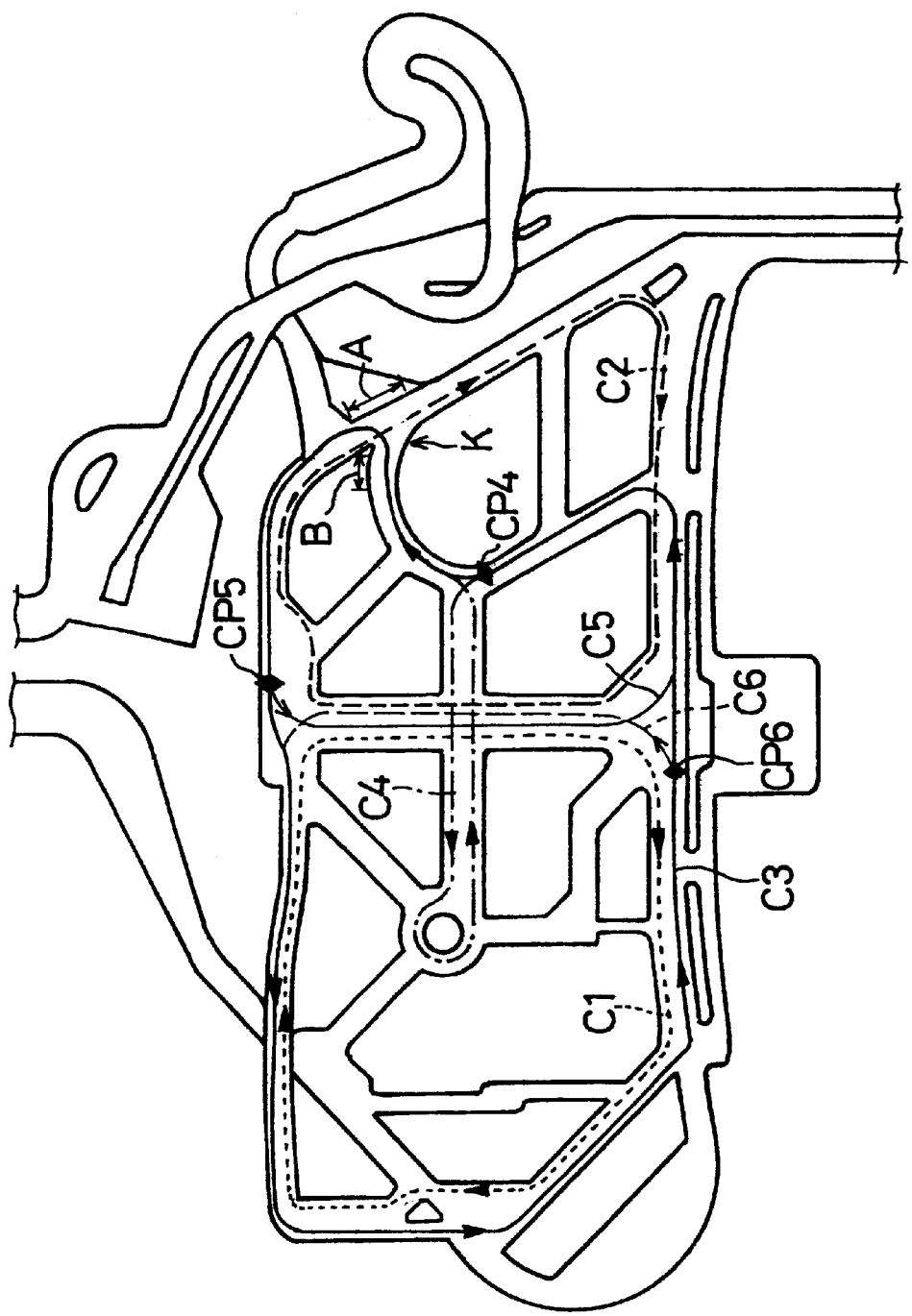
FIG. 11 is a diagram of a part of a road in a town showing a running course of general cars.

Next, with reference to FIGS. 6 and 11, the general car controller 252 will be described. FIG. 11 is a diagram showing a part of the road 12 as a running course of the general cars as a control object.

The general car controller 252 controls the running of a plurality of general cars which function as obstacles on the road 12, specifically successively controls the running of the respective general cars.

The general car controller 252 causes the respective general cars to move along the trace points set in the world coordinate systems. These trace points are comprised of six data of coordinates (x, y, z) and an inclination ($r_x$, $r_y$, $r_z$) as can be seen from:

$TP_A$ ($x_A$, $y_A$, $z_A$, $r_{xA}$, $r_{yA}$, $r_{zA}$)

$TP_B$ ($x_B$, $y_B$, $z_B$, $r_{xB}$, $r_{yB}$, $r_{zB}$).

On the other hand, the controller 25 operates at 29 (interruptions per second), and a 1 (cm/interruption) corresponds approximately to 1 km/h. Accordingly, in order to smoothly move the general cars, the trace points need to be set at small intervals. However, in such a case, a quantity of data becomes huge, making it difficult to display images on the display monitor 2 in real time.

In view of this, according to this embodiment, the trace points are set at an interval of about 1 meter and each interval is divided into 32 sections in the game program. This enables the speed to be changed in about 3 km/h.

Specifically, the general car controller 252 controls the speed of the general car by a trace speed which is the number of section points the general car passes in one interrupt. For example, if the general car starts running at a trace speed of 10 from a certain trace point, it reaches the fifth trace point after 16 interrupts.

As shown in FIG. 11, the trace points are set on courses C1 to C6 where the general cars are permitted to run. On the course C3 are set course change enabling points CP4 to CP6 where the running course may be changed to the courses C4 to C6.

For each of the courses C4 to C6 is set a maximum number of general cars which can run thereon. When the general cars reach the course change enabling points CP4 to CP6, the numbers of general cars running on the courses C4 to C6 are discriminated. If the discriminated numbers are smaller than the maximum numbers, the course change is effected by random numbers.

During usual running, the calculation is performed using only the two-dimensional coordinates (x, y) of the trace points. A distance calculation is performed based on the number of trace points, thereby shortening a calculation time.

In FIG. 6, the general car discriminator 521 discriminates whether there is an other general car at an intersection or branching point ahead. In a range including the intersection or the branching point, sections defined by a predetermined number of trace points are set. The general car discriminator 521 makes the above discrimination by discriminating whether there is an other general car in these sections.

For example, in FIG. 11, if a general car running on the course C2 is found in a section A when a general car running on the course C3 approaches an intersection K at a right end, the general car discriminator 521 discriminates the presence of another general car.

Referring back to FIG. 6, the distance calculator 522 calculates a variety of distances concerning the running of the general cars. For example, the distance calculator 522 calculates a distance between one general car and a stop line at the intersection or the branching point ahead where a traffic light is set and a distance between one general car and another general car running ahead in the same direction.

The player's/rival car discriminator 523 discriminates whether there is the player's car and a rival car ahead; calculates a distance to this car; and, when the calculated distance is smaller than a predetermined distance, outputs a signal indicative thereof to the speed controller 524 and the motion processor 525. The speed controller 524 controls the speed of the general cars based on the calculation results of the distance calculator 522 and the discrimination result of the player's/rival car discriminator 523.

The motion processor 525 performs the motion processing for the general cars at a speed controlled by the speed controller 524, and performs such a motion processing as to avoid the player's or rival car to collide with based on the discrimination result of the player's/rival car discriminator 523. A coordinate data after the motion is sent to the position determinator 254.

The motion processor 525 performs the motion processing such that if a general car is running on the course C2 in the section A when a general car which is being controlled and running on the course C3 approaches the intersection K at the right end, thereby discriminating the presence of another car in FIG. 11 as mentioned above, the general car being controlled is stopped before a section B.

Next, referring back to FIG. 6, the rival car controller 253, the position determinator 254 and the graphic processor 255 are described.

The rival car controller 253 controls the running of the rival cars competing with the player's car. This control is described in detail later.

The position determinator 254 searches all cars existing within a predetermined field of view using the coordinate data of the respective cars sent from the player's car controller 251, the general car controller 252 and the rival car controller 253, and sends the obtained data concerning the searched cars within the field of view to the graphic processor 255.

Further, the position determinator 254 determines a positional relationship between the player's car and the general and rival cars to see a possibility of a contact, collision or the like and a positional relationship between the player's car and road sides. Upon the determination that there has been a contact or collision between the player's car and an other car and/or between the player's car and a road side, the position determinator 254 sends a collision signal to the graphic processor 255.

The positional relationship determination is performed using only the two-dimensional coordinate data (X, Y). By doing so, since the calculation can be performed at a higher speed, processing can be performed in real time even if the number of general cars increases, making the game more complicated and interesting.

A position of view point is set at a predetermined distance behind the player's car and slightly upward. A direction of gaze is so set as to correspond with the orientation of the player's car. The field of view is set based on the angles to the left and right with respect to the orientation of the player's car and a distance from the position of view point.

The graphic processor 255 causes images of all the cars searched by the position determinator 254 and images of the road 12 (see FIG. 3) and models such as buildings near the road 12 which are located within the field of view to be displayed on the display monitor 2 after applying a known three-dimensional image processing such as a geometry processing or rendering.

When displaying the road 12, the road in the necessary blocks located within the field of view is displayed (see FIG. 5). When the orientation of the player's car changes, the coordinate data of the road is displayed by rotating it in a direction opposite to a changing direction.

The graphic processor 255 displays a spinning and/or vibrating image on the display monitor 2 upon the receipt of the collision signal from the position determinator 254.

The graphic processor 255 also displays the course map shown in FIG. 4 on the display monitor 2 and dot-displays the position of the player's car on the course map. The course map is displayed based on the running direction of the player's car obtained from the player's car controller 251. For example, if the player's car turns left at an intersection or a branching point, the course map is displayed by rotating it in an opposite direction, i.e., to the right.

In this way, since the player can constantly see the course map with his car as a central figure, he can grasp his car's positional relationship on the course map at once. Conventionally, the position of the player's car has been dot-displayed on the fixed course map. In such a case, the player feels a sense of incongruity when the dots indicating the player's car move downward while the player's car is running forward, and the configuration of the street ahead needs to be considered by inverting with respect to a transverse direction. However, this embodiment is free from such disadvantages, so that the player can easily grasp the configuration of the road ahead.

In this game machine, as shown in FIG. 4, the course map expressing the road 12 by the two-dimensional coordinate data is displayed on the display monitor 2. In FIG. 4, a triangle or rectangle enclosed by straight lines constructs one polygonal plane.

Figure 12:
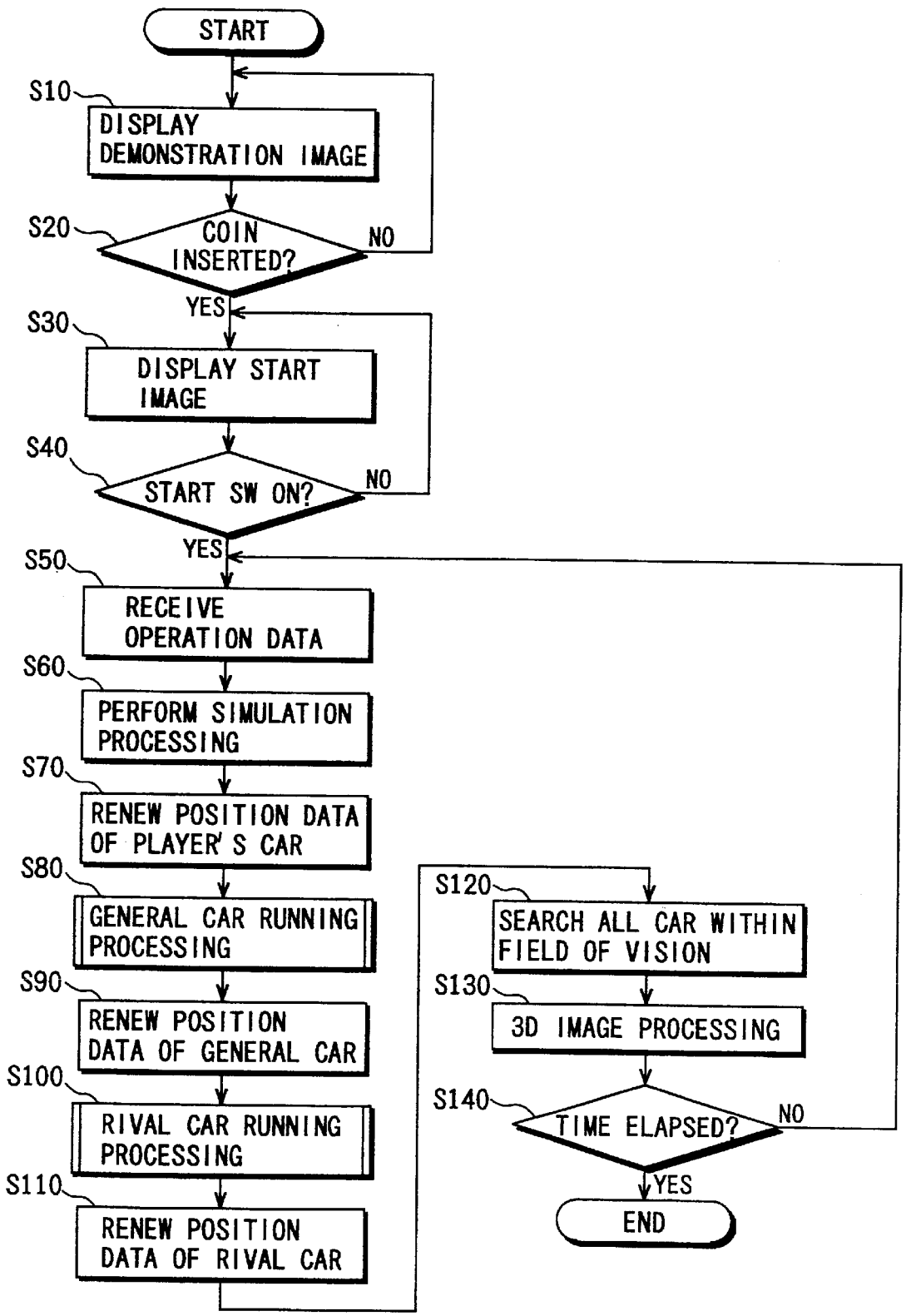
FIG. 12 is a flowchart showing a main routine of the game machine.

Next, the operation procedure of this driving game machine will be described. FIG. 12 is a flowchart showing a main routine of this driving game machine.

When the driving game machine is plugged in, a demonstration image is displayed on the display monitor 2 by the graphic processor 255 (Step S10). It is then discriminated whether a coin has been inserted into the coin slot 8 (Step S20). Unless a coin has been inserted (NO in Step S20), the display of the demonstration image of Step S10 is continued. When a coin is inserted (YES in Step S20), a start image is displayed by the graphic processor 255 (Step S30).

Subsequently, it is discriminated whether the start switch 9 has been pressed (Step S40). Unless the start switch 9 has been pressed (NO in Step S40), the display of the start image of Step S30 is continued. When the start switch 9 is pressed (YES in Step S40), the game is started and the player drives his car by operating the respective elements of the driving operation unit 22.

The operation data of the respective elements sent from the driving operation unit 22 are received by the player's car controller 251 (Step S50). A simulation processing in accordance with automotive engineering is performed according to the car motion program stored in the ROM 23 (Step S60). The position data of the player's car in the world coordinate systems determined in the processing of Step S60 is renewed (Step S70).

Subsequently, a general car running processing to be described later is performed by the general car controller 252 (Step S80). The position data of the general cars in the world coordinate systems determined in the processing of Step S80 are renewed (Step S90). Then, a rival car running processing to be described later is performed by the rival car controller 253 (Step S100), and the position data of the rival cars in the world coordinate systems determined in the processing of Step S100 are renewed (Step S110).

All cars located within the field of view are then searched by the position determinator 254 (Step S120). The graphic processor 255 performs the three-dimensional image processing based on the position and orientation of the player's car determined by the simulation processing of Step S60, and a resulting image is displayed on the display monitor 2 (Step S130). It is then discriminated whether a predetermined time has elapsed after the start of the game (Step S140). Unless this predetermined time has elapsed (NO in Step S140), the main routine returns to Step S50 to repeat the running control by performing the similar processing. Upon the elapse of the predetermined time (YES in Step S140), time is up and the game ends.

Instead of pressing the start switch 9, the game may be started upon the insertion of a coin. Further, the game may end when the player's car reaches the goal point of the road 12 even if the predetermined time has not yet elapsed.

Figure 13:
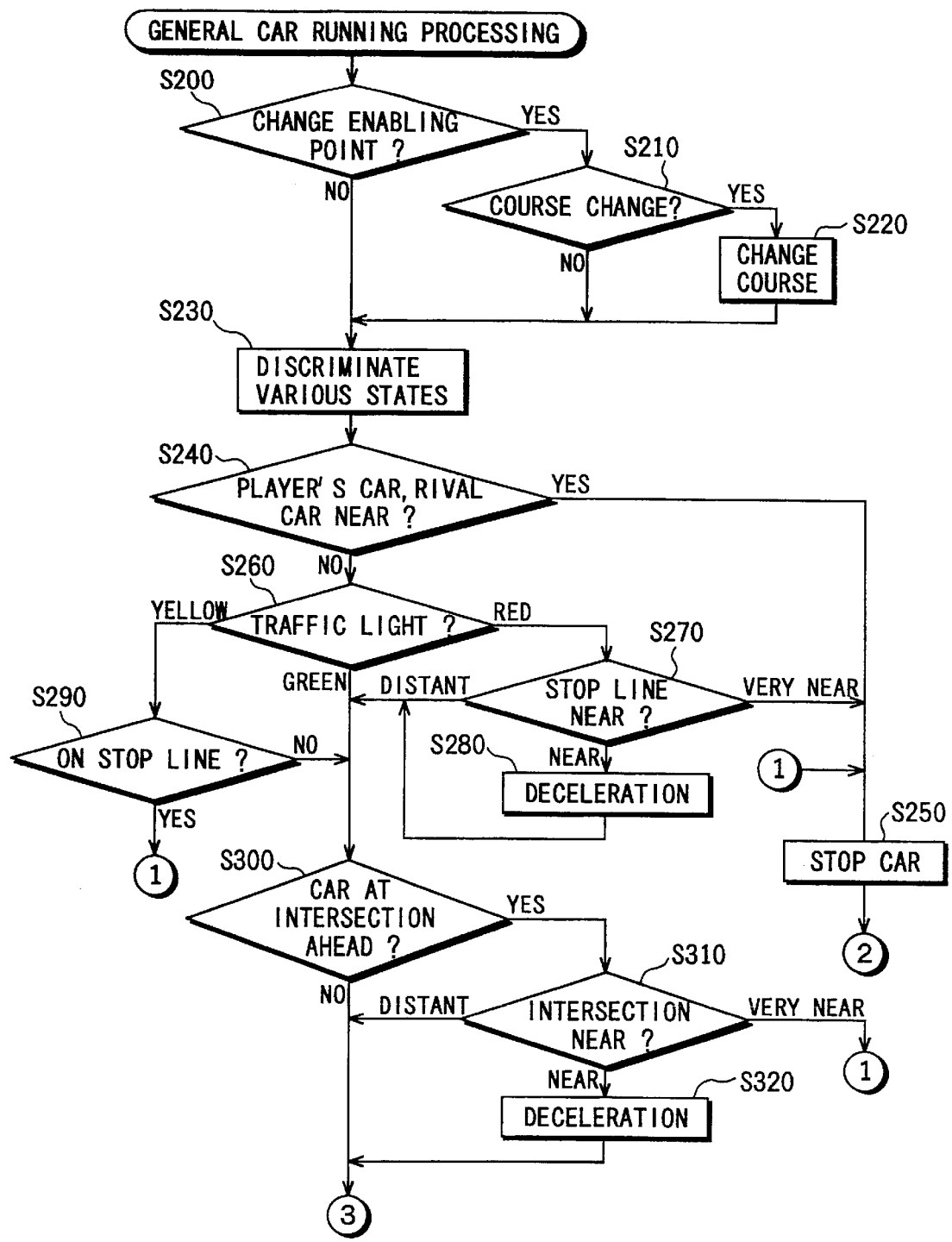
FIGS. 13 and 14 are flowcharts showing a subroutine executed in Step S80 of FIG. 12.
Figure 14:
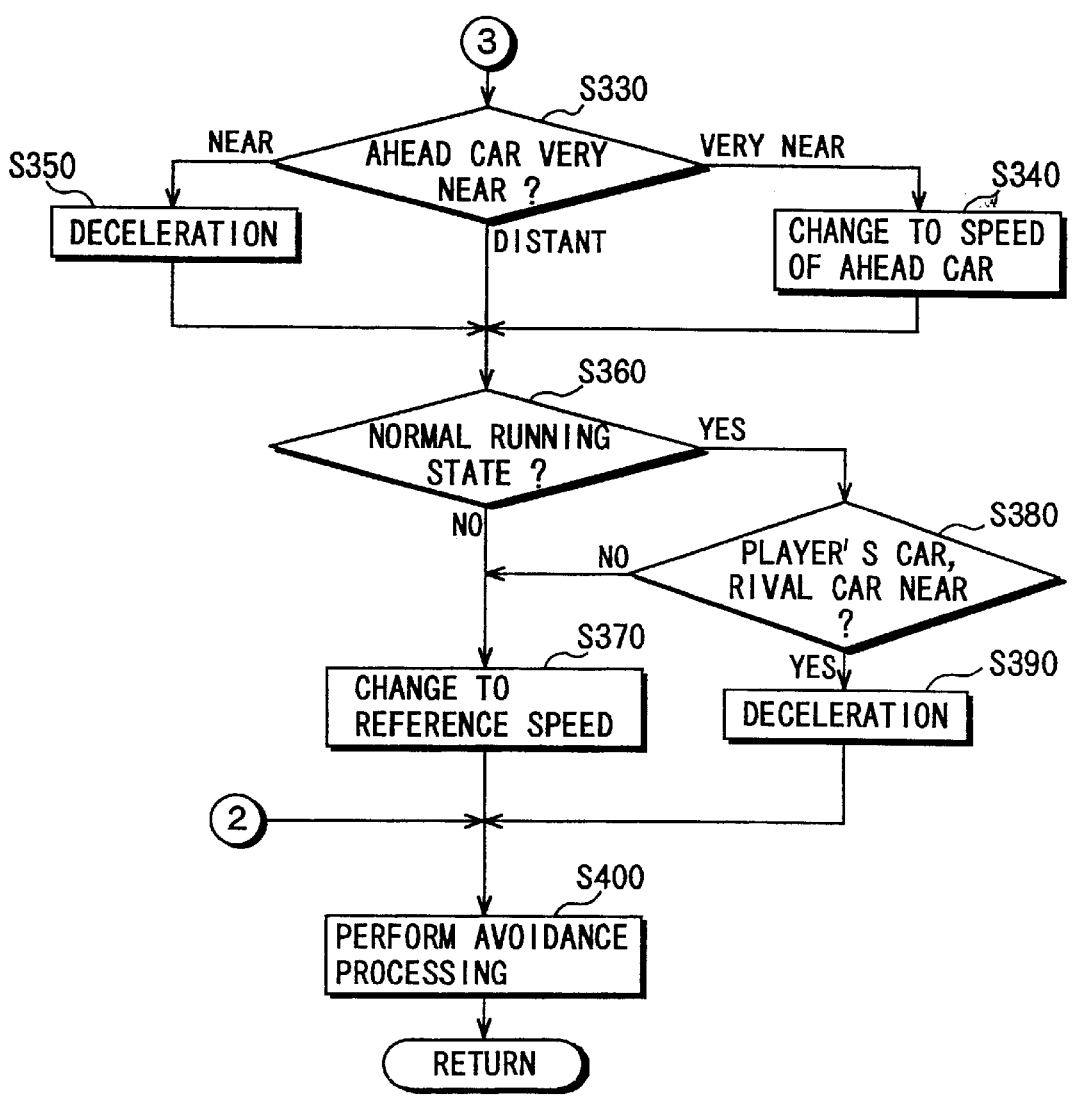

FIGS. 13 and 14 are a flowchart showing a subroutine executed in Step S80 of FIG. 12.

First, it is discriminated whether there is one of the course change enabling point CP4 to CP6 ahead (Step S200). If there is a course change enabling point, whether the general car being controlled will change its course is discriminated in consideration of whether the number of the general cars on the course which this general car may enter is smaller than a set maximum number (Step S210). In the case of a course change, the general car being controlled changes its course using a random number (Step S220).

Subsequently, various states are discriminated (Step S230). These states include the color of a traffic light ahead, the presence of an other general car at an intersection or a branching point ahead, a distance to this other general car ahead, and the presence of the player's car or the rival car ahead at a distance shorter than the predetermined distance from the general car being controlled. In this case, the distance is discriminated using the trace points.

It is then discriminated whether there is the player's car or the rival car ahead of the general car being controlled at a distance shorter than a predetermined short distance (Step S240), and this general car is stopped (Step S250) when there is the player's car or the rival car exists (YES in Step S240).

If the traffic light ahead is red (RED in Step S260), the general car being controlled is stopped (Step S250) if the distance to the stop line is a predetermined very short distance (e.g., 1 trace point) (VERY NEAR in Step S270). Also, if the distance is a predetermined short distance (e.g., 10 trace points) (NEAR in Step S270), the controlled general car is decelerated (Step S280).

If the traffic light ahead is yellow (YELLOW in Step S260), this general car is stopped (Step S250) if it can stop on and before the stop line (YES in Step S290). If it is impossible (NO in Step S290), on the other hand, this general car continues to run.

Thereafter, if there is discriminated to be an other general car at the intersection or the branching point ahead (Step S300), the general car being controlled is stopped (Step S250) if the distance to the intersection or the branching point is a predetermined very short distance (e.g., 1 trace point) (VERY NEAR in Step S310). On the other hand, if the distance is a predetermined short distance (e.g., 5 trace points) (NEAR in Step S310), the controlled general car is decelerated (Step S320).

If a distance to the other general car ahead is discriminated to be a predetermined very short distance (e.g., 3 trace points) (VERY NEAR in Step S330), the speed of the general car being controlled is changed to that of the other general car ahead. Also, if the ahead general car is at a predetermined short distance (e.g., 7 trace points) (NEAR in Step S330), the controlled general car is decelerated (Step S350).

Subsequently, it is discriminated whether the general car being controlled is in its normal running state, i.e., it is neither decelerating nor stopping (Step S360). This general car is decelerated (Step S390) if it is normally running (YES in Step S360) and the player's car or the rival car is at a predetermined short distance (e.g., 3 trace points) (YES in Step S380). Unless this general car is in the normal running state, the running speed thereof is changed to a reference speed (Step S370).

In the case that the player's car or the rival car is very near (e.g., 2 trace points), an avoidance processing is performed to change the orientation of this general car (Step S400), thereby completing this subroutine.

Figure 15:
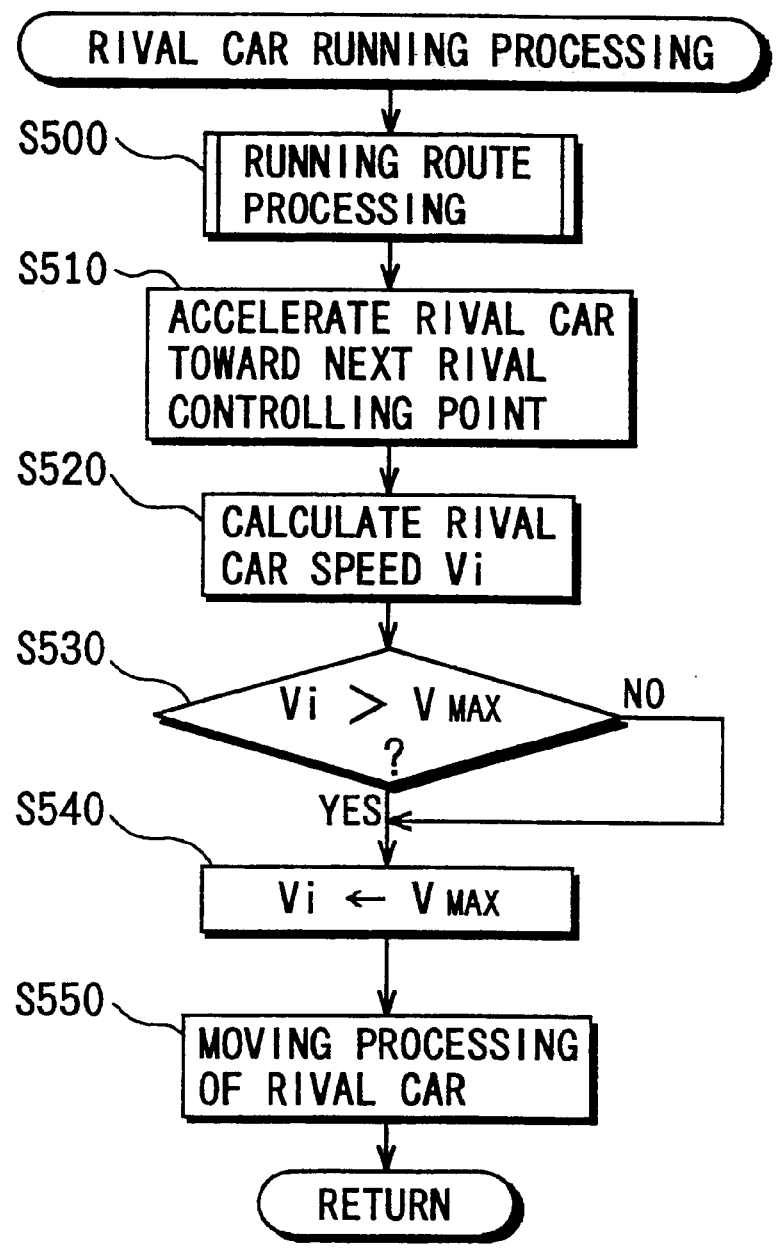
FIG. 15 is a flowchart showing a subroutine executed in Step S100 of FIG. 12.
Figure 16:
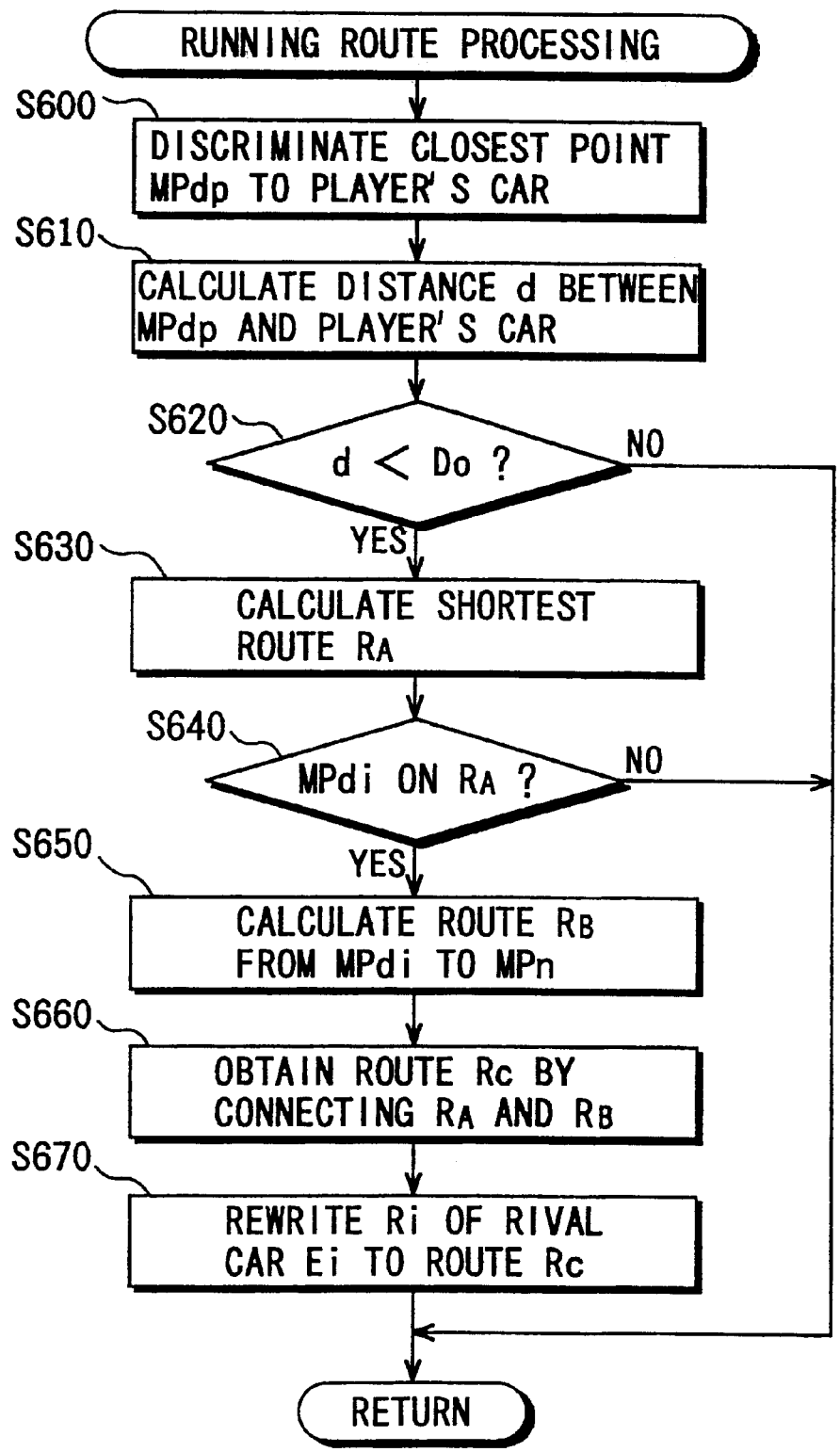
FIG. 16 is a flowchart showing a subroutine executed in Step S500 of FIG. 15.

FIG. 15 is a flowchart showing a subroutine executed in Step S100 of FIG. 12; FIG. 16 is a flowchart showing a subroutine executed in Step 500 of FIG. 15; and FIG. 17 is a diagram of the road 12 showing rival car controlling points.

Figure 17:
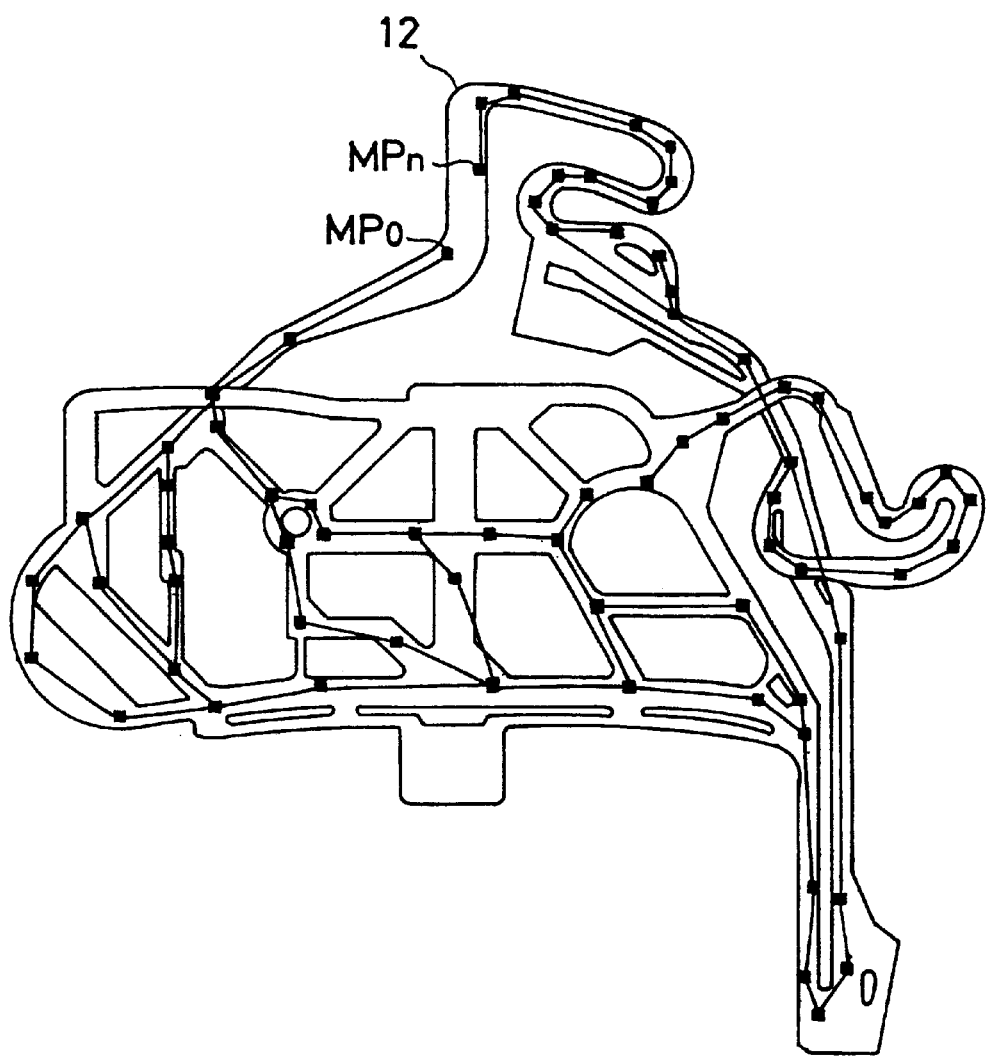
FIG. 17 is a diagram of the road showing rival car controlling points.

The rival car controller 253 controls the running of a plurality of rival cars Ei (i=1, . . . , k) using the rival car controlling points set in advance on a specified course of the road 12 as shown in FIG. 17.

Assuming $MP_0$, $MP_n$, $MP_{di}$ denote a rival car controlling point at the start point, a rival car controlling point at the goal point and a present target rival car controlling point during the running between the controlling points, respectively, the rival car controller 253 gives a running route Ri to the rival car Ei in the form of a string of the rival car controlling points ($MP_0$, . . . , $MP_{di}$, . . . , $MP_n$).

In FIG. 15, a running route processing to be described later is first performed (Step S500). Subsequently, the rival car is accelerated toward the next target rival controlling point $MP_{di}$ (Step S510), and a speed Vi of this rival car is calculated (Step S520). At this time, each rival car Ei has an acceleration peculiar thereto, and the running is controlled in view of this peculiar acceleration.

It is discriminated whether the speed Vi is larger than a predetermined speed $V_{MAX}$ (Step S530). If Vi>$V_{MAX}$ (YES in Step S530), the speed Vi is limited to $V_{MAX}$ (Step S540). This subroutine ends after a moving processing of the rival car Ei is performed (Step S550).

In FIG. 16, a rival car controlling point $MP_{dp}$ closest to the player's car is discriminated (Step S600), and a distance d between this rival car controlling point $MP_{dp}$ and the player's car is calculated (Step S610).

It is then discriminated whether the calculated distance d is shorter than a predetermined distance $D_0$ (Step S620). This distance $D_0$ is a value indicating a degree by which the player's car is away from the running route of the rival car. If d≧$D_0$ (NO in Step S620), the player's car is sufficiently away from the running route of the current rival car. Accordingly, this subroutine ends without rewriting the running route.

On the other hand, if d<$D_0$ (YES in Step S620), a shortest route $R_A$ from the rival car controlling point $MP_0$ at the start point to the rival car controlling point $MP_{dp}$ closest to the player's car is calculated (Step S630). It is then discriminated whether the current target rival car controlling point $MP_{di}$ is located on this route $R_A$ (Step S640). This subroutine ends if the controlling point $MP_{di}$ is not located on the route $R_A$ (NO in Step S640).

On the other hand, if the controlling point $MP_{di}$ is located on the route $R_A$ (YES in Step S640), a route $R_B$ from this controlling point $MP_{di}$ to the rival car controlling point $MP_n$ at the goal point is calculated (Step S650).

Subsequently, a route $R_C$ is obtained by connecting the routes $R_A$ and $R_B$ (Step S660); the running route Ri of the rival car Ei is rewritten to the route $R_C$ (Step S670); and this subroutine ends.

As described above, when the distance d between the player's car and the rival car controlling point $MP_{dp}$ closest to the player's car is shorter than the predetermined distance $D_0$ and the current target rival car controlling point $MP_{di}$ is located on the shortest route $R_A$ from the rival car controlling point $MP_0$ at the start point to the controlling point $MP_{dp}$, the running route Ri of the rival car Ei is rewritten. Accordingly, the rival car follows up the player's car when a distance between the player's car and the rival car becomes short during the race. This makes the player feel more as if he were actually competing in the driving race, making the game more interesting.

Subsequently, a modification in which two players are enabled to compete with each other is described.

In this modification, two driving game machines of FIG. 1 are connected with each other via a communication line, and the controller of each driving game machine is provided with a communication controller 256 indicated by phantom line in FIG. 6 and an unillustrated selection key for selecting the competition with the other player, in addition of the respective elements of the foregoing embodiment.

The communication controller 256 of one driving game machine transmits the coordinate data concerning the position of the player's car to the other driving game machine, and receives the coordinate data concerning the player's car controlled by the other driving game machine, i.e., the position of a communications car of this driving game machine and sends it to the position determinator 254.

In this modification, the position determinator 254 further determines a positional relationship between the player's car and the communications car and a positional relationship between the general cars and the communications car and discriminates the communications car located within the field of view. When a contact or collision between the player's car and the communications car is determined, the position determinator 254 sends a collision signal to the graphic processor 255.

Further, the general car controller 252 makes discriminations concerning the communications car in addition to the discriminations concerning the player's car and the rival cars. The graphic processor 255 causes the communications car to be displayed on the display monitor 2 when the communications car is located within the field of view.

As described above, since the communication controller 256 is provided in each game machine to transmit and receive the position data concerning the player's car of each game machine, the players are enabled to compete with each other, with the result that the driving game can be made even more interesting.

Next, there is described a modification provided with the communication controller 256 which is used to play a game different from a car race.

This game is a "tag" game in which there is a car corresponding to a "chaser" and this "chaser" is switched by the contact of cars operated by the respective players.

In this modification, the position determinator 254 further determines the car corresponding to the "chaser"; determines the contact of the car corresponding to the "chaser" with an other car; determines that the "chaser" has been switched to the contacted car if the contact is discriminated. At this time, the position determinator 254 determines that the "chaser" has been switched when the cars are held in contact with each other for a predetermined time (e.g., 0.3 sec.) or longer.

Figure 18:
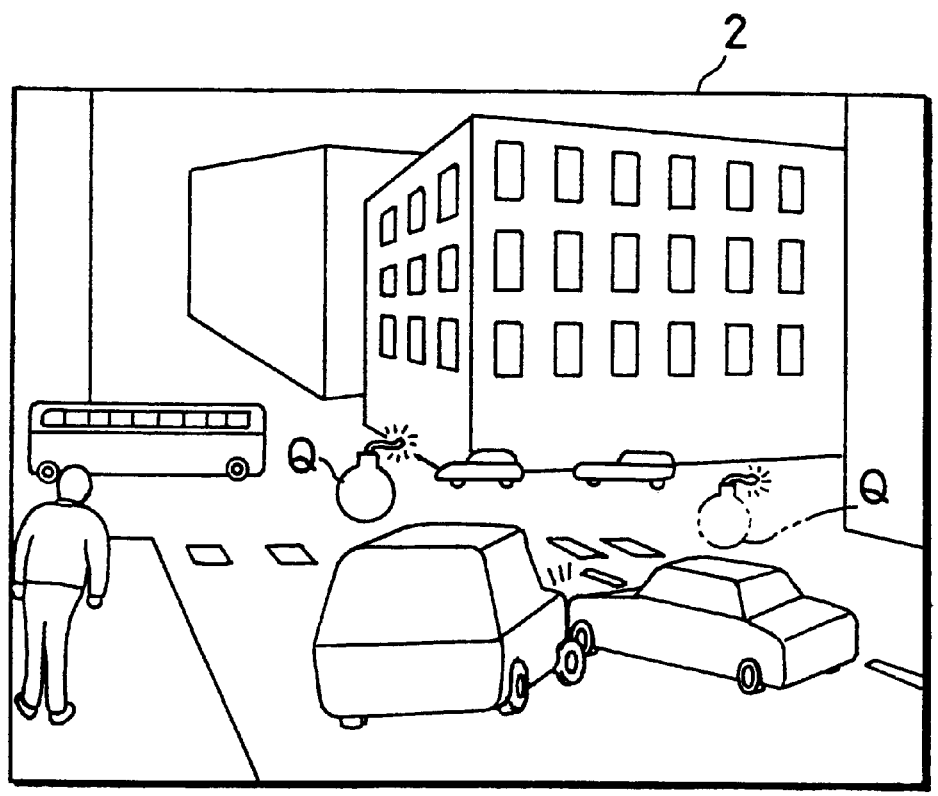
FIG. 18 is a diagram showing an example of display monitor image in a different embodiment.

The graphic processor 255 displays a time bomb Q (target display or icon) having a fired blasting fuse above or near the car corresponding to the "chaser" as shown in FIG. 18, and moves a display position of the time bomb Q to a car which is going to be a new "chaser" as shown by phantom line in FIG. 18 when the position determinator 254 determines that the "chaser" has been switched.

Further, the graphic processor 255 counts an elapse of time from the start of the game, and shortens the remaining blasting fuse at a specified speed as the time elapses. Upon the elapse of a predetermined time after the start of the game, an image showing an explosion is displayed after an image in which the blasting fuse has been burnt to the end is displayed.

The graphic processor 255 constructs the time bomb Q by the flat polygonal data, and displays the time bomb Q on the display monitor 2 in such a manner that the polygonal plane constantly faces the gaze of the player, i.e., one who is operating the player's car of each driving game machine when the display position of the time bomb Q is moved after the "chaser" was switched.

As described above, since the contact of the cars is discriminated and the switch of the "chaser" is determined by the contact of the cars, the driving game machine can be applied to a new "tag" game, making the game machine more interesting.

Further, by determining that the "chaser" has been switched when the cars continue to be in contact with each other for the predetermined time, there can be prevented an undesirable event where the time bomb Q frequently moves when the cars are brought into contact a plurality of times for a short time, making it difficult to see the image on the display monitor 2.

Furthermore, by constructing the time bomb Q by the flat polygonal data and displaying it in such a manner that the polygonal plane constantly faces the gaze of the player, the time bomb Q which is a two-dimensional image can be stably shown to the respective players.

In the foregoing modification, the "chaser" is represented by the time bomb Q. However, there may be other many ways to represent the "chaser". For example, the "chaser" may be represented by lighting on and off the car, or by changing over the color of the car.

The invention is not limited to the foregoing embodiments and modifications, but may be embodied as follows.

(1) Although the controller 25 is provided for each driving game machine in the foregoing modifications, a single controller for centrally controlling a plurality of driving game machine may be provided. In such a case, the communication controller 256 is not necessary.

(2) In the foregoing modifications, the number of driving game machines to be connected is not limited to two, but three or more driving game machines may be connected. In this way, the number of communications cars can be increased, thereby making the driving game further interesting.

(3) In the road 12, the center line of predetermined section(s) may be so displayed as to forbid passing, and no restriction may be given to the control for the player's car. With this arrangement, the driving with this game machines can be approximated to actual driving, making the player feel more as if he were actually driving. Further, in addition to "No Passing" display, the player's car may be prohibited from changing its lane in the player's controller 251 and the position determinator 254. This makes the game more complicated and interesting.

(4) The ROM 23 may be constructed by a CD-ROM, optical disk, memory card, floppy disk or like portable storage medium, so that the game program can be easily exchanged and/or renewed.

(5) A television may be used as the display monitor 2. Further, the accelerator pedal 5 and the brake pedal 6 may be realized by switch buttons which are operable by hand instead of the pedals operated by foot.

As described in details above, a driving game machine of the present invention comprises: operation means for generating an operation signal in accordance with a player's operation; road data storage means for storing coordinate data of a road set in a game space; player's car control means for controlling the running of a player's car on the road in accordance with an operation signal from the operation means. A running course from a start point to a goal point of the road is provided with a plurality of branched roads in its intermediate positions. The player's car control means causes the player's car to run in a direction selected by the player at each branching point which leads to one of the branched roads based on the operation signal from the operation means.

The player's car runs on the road set within the game space according to the player's operation. The image within the predetermined field of view is displayed on the display monitor. The player's car runs in a direction chosen by the player at the branching point along the running course between the start and goal points. Accordingly, the driving is made more complicated to make the player feel more as if he were actually driving. Thus, the driving game becomes more interesting.

The branching point is provided with crossroads formed by intersecting the plurality of branched roads. The running direction of the player's car can be chosen from three directions at the crossroads, thereby making the driving more complicated and making the player feel more as if he were actually driving. Thus, the driving game becomes more interesting.

The branched road is provided with a plurality of main branched roads forming the running course from the start point to the goal point and a plurality of auxiliary branched roads branched off from the main branched roads. Since the running course of the player's car can be chosen from the plurality of main branched roads and the plurality of auxiliary branched roads, the driving can be made more complicated and the player can feel more as if he were actually driving. Thus, the driving game becomes more interesting.

There is further provided general car control means for controlling the running of a plurality of general cars on the roads. Since the plurality of general cars run on the plurality of branched roads, the player has to run the player's car while avoiding to contact or collide with the general cars. This makes the driving further more complicated and the player feel even more as if he were driving. Thus, the driving game becomes even more interesting.

The running course of the general cars are changed at the branching points when a predetermined condition is satisfied. Accordingly, the running of the general cars becomes more complicated, enabling the player to enjoy more complicated driving and feel more as if he were actually driving. Thus, the driving game becomes more interesting.

The general car control means successively controls the running of the respective general cars as a control object. The general car control means is provided with car distance discrimination means for discriminating a distance from the general car being controlled to the player's car. The speed and running direction of the general car is controlled according to the discriminated distance to the player's car. The general car can be controlled to be decelerated or avoid a contact with the player's car if, for example, the discriminated distance is a short distance. Accordingly, the player's car is permitted to run at high speed, making the driving further more complicated and making the player feel even more as if he were actually driving. Thus, the driving game becomes even more interesting.

The general car control means is provided with general car discrimination means for discriminating whether there is an other general car at a branching point located ahead of the general car being controlled, branching point distance discrimination means for discriminating a distance from the general car being controlled to the branching point located ahead of the general car being controlled, and speed control means for controlling the speed of the general car being controlled based on a discrimination result of the general car discrimination means and a discrimination result of the branching point distance discrimination means. Further, there is provided distance storage means for storing a predetermined first distance and a predetermined second distance longer than the first distance. The speed control means stops the general car being controlled when there is discriminated to be an other general car at the branching point and the discriminated distance to the branching point is shorter than the first distance while decelerates the general car being controlled when there is discriminated to be an other car at the branching point and the discriminated distance to the branching point is equal to or longer than the first distance and shorter than the second distance. Accordingly, the collision and contact of the general cars can be securely prevented, thereby preventing the collision or contact of the general cars from hindering the running of the player's car.

There is further provided a traffic light at the branching point. The traffic light is controlled by traffic light control means. The traffic lights make the player feel more as if he were driving on the actual road, making the driving game more interesting. The general car controller controls the running of a plurality of general cars on the road in accordance with the traffic lights. The general cars run in accordance with the traffic lights. Accordingly, it becomes easier to avoid the general cars and the player's car can run at a higher speed, making the driving game even more interesting.

Also, a driving game machine of the present invention is provided with player's car control means for controlling the running of a player's car on the road in accordance with an operation signal from the operation means and rival car control means for controlling the running of a rival car on the road. This can provide the player with a competition against the rival car, thereby making the driving game more interesting.

There is further provided general car control means for controlling the running of a plurality of general cars on the roads. The general car control means includes rival car distance discrimination means for discriminating a distance from the general car being controlled to the rival car to control the speed and running direction of the general car being controlled based on the discriminated distance to the rival car. Further, the rival car control means selects one of a plurality of predetermined running courses of the road so that the rival car runs along the selected course. The rival car control means is provided with distance calculation means for calculating a distance between the running course on which the rival car is running and the player's car, and course changing means for changing the running course of the rival car to such a running course of the plurality of predetermined running courses that has a portion closer to the player's car when the calculated distance is shorter than a predetermined value. Accordingly, the rival car can run at high speed, the competition between the player's car and the rival car can be intensified. This will make the driving further more complicated and the player feel even more as if he were actually driving. Thus, the driving game becomes even more interesting.

Further, a driving game machine of the present invention comprises three-dimensional data storage means for storing coordinate data of a three-dimensional road which are set in a three-dimensional coordinate system within a game space. Player's car control means controls the running of a player's car on the three-dimensional road in accordance with an operation signal from the operation means, and general car control means controls the running of a plurality of general cars on the three-dimensional road. An image of the game space is displayed within a predetermined field of view by applying a three-dimensional image processing. A positional relationship between the player's car and the general cars is determined using only two-dimensional coordinate data. Accordingly, more complicated and realistic driving game can be provided in a shorter time. Also, a greater number of general cars can be added in the game space because position calculation is executed in a shorter time. Thus, the driving game can be made more interesting.

Furthermore, a driving game machine of the present invention comprises map display processing means for displaying a map showing the entire road on the display monitor on the basis of the running direction of the player's car. The player's car runs on the road set within the game space according to an operation signal of the operation means. The image which changes as the player's car runs is displayed on the display monitor. The map representing the entire road is displayed on the display monitor on the basis of the running direction of the player's car. Accordingly, a next change on the road with respect to the running direction of the player's car can be easily known and the player can enjoy a high speed driving.

Moreover, according to the present invention, the operation means includes a steering wheel for changing the orientation of a car, an accelerator pedal for accelerating the car, a brake pedal for decelerating the car, and a side brake for locking the rear wheels of the car to generate an operation signal in accordance with player's operation of them. The player's car control means includes steering wheel operated amount detection means, accelerator pedal operated amount detection means, brake pedal operated amount detection means, side brake operated amount detection means, car speed calculation means, and lock condition determination means. When the steering wheel, accelerator pedal, brake pedal and/or side brake are operated, the operated amounts of the respective members are detected. The running of the player's car is controlled according to the operated amounts. The speed of the player's car is calculated according to the detected operated amounts of the accelerator pedal and the brake pedal, and whether or not the lock condition under which the rear wheels are locked is satisfied is discriminated based on the calculated speed and the detected operated amount of the side brake. This makes the driving more complicated and the player feel as if he were actually driving. Thus, the driving game can be made more interesting.

There is further provided first slip condition storage means for storing a slip condition predetermined in correspondence with the car speed and the operated amount of the steering wheel under which the car slips when the rear wheels are not locked, and second slip condition storage means for storing a slip condition predetermined in correspondence with the car speed and the operated amount of the steering wheel under which the car slips when the rear wheels are locked. It is determined whether each slip condition is satisfied using the calculated car speed, the detected operated amount of the steering wheel and the determined lock condition. This makes the driving more complicated and the player feel as if he were actually driving. Thus, the driving game can be made more interesting.

Moreover, a driving game machine of the present invention displays an image which is changeable with simulative driving of a car on a road set within a game space on a display monitor in real time, and comprises contact determination means for determining whether a player's car and a rival car have contacted, and target display control means for displaying on the display monitor a target representation indicating that either one of the player's car and the rival car is target, and switching the target representation from one of the player's car and the rival car to the other when there is discriminated to be a contact between the player's car and the rival car in addition to operation means, road data storage means, player's car control means, rival car control means, and display processing means. As the target representation, a specified icon is displayed in proximity to either one of the player's car and the rival car on the display monitor. Accordingly, by switching the target representation when the contact of the player's car and the rival car is determined, other games such as a tag can be enjoyed with this game machined by, for example, assuming the target representation to be a "chaser".

Also, there is provided a plurality of operation units respectively provided for a plurality of players, each operation unit for generating an operation signal in accordance with a player's operation, player's car control means for controlling the running of player's cars corresponding to the plurality of players on the road in accordance with operation signals from the plurality of operation units, respectively, display processing means for displaying an image of the game space within a predetermined field of view on the display monitor. A target representation is switched from one of player's cars to another when there is discriminated to be a contact between player's cars. In this construction, a plurality of players can run their respective cars individually to enjoy the "tag" game.

There is provided a computer readable storage medium storing a driving game program which render a computer to execute a procedure that a player's car simulatively runs on a road set within a game space in accordance with an operation signal from operation means operable by a player, and an image of the game space within a predetermined field of view is displayed on the display monitor, the road including a start point and a goal point which defines a running course which has a plurality of branched roads in intermediate positions thereof, the driving game program having a control step of controlling the player's car to run at each branching point which leads to one of the branched roads in a direction in accordance with an operation signal from the operation means. This storage medium enables the realization of the same operation as the game machine according to the invention, making the driving more complicated and the player feel as if he were actually driving. Thus, the driving game can be made more interesting.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A driving game machine comprising:
   operation means for generating an operation signal in accordance with a player's operation;
   road data storage means for storing coordinate data of a road set in a game space, the road having a start point and a goal point, a running course from the start point to the goal point including branched roads at branching points located in intermediate positions therealong;
   player's car control means for controlling the running of a player's car on the road in accordance with an operation signal from the operation means, said player's car control means causing the player's car to run in a direction selected by the player at each of said branching points which leads to one of the branched roads based on the operation signal from the operation means;
   display processing means for displaying an image of the game space within a field of view set in advance;
   a traffic light provided at at least one of said branching points;
   traffic control means for controlling the traffic light; and
   general car control means for controlling the running of general cars on the road in accordance with the traffic light.

2. A driving game machine according to claim 1, wherein the branching points include crossroads formed by intersecting branched roads.

3. A driving game machine according to claim 1, wherein the branched roads include main branched roads forming the running course from the start point to the goal point and auxiliary branched roads branched off from the main branched roads.

4. A driving game machine according to claim 1, further comprising general car control means for controlling the running of a plurality of general cars on the roads.

5. A driving game machine according to claim 1, wherein the traffic control means executes a control to change traffic light to green, yellow and red in a specified cycle.

6. A driving game machine according to claim 1, further comprising a railroad crossing provided in the running course and a crossing gate at the railroad crossing.

7. A driving game machine according to claim 6, further comprising a control member for controlling a lowering of the crossing gate of the railroad crossing at a specified timing.

8. A driving game machine capable of affording a competition between a player's car and a rival car, the driving game machine comprising:
   operation means for generating an operation signal in accordance with a player's operation;
   road data storage means for storing coordinate data of a road set in a game space, the road having a start point and a goal point, a running course from the start point to the goal point including branched roads at branching points located in intermediate positions therealong;
   player's car control means for controlling the running of a player's car on the road in accordance with an operation signal from the operation means, said player's car control means causing the player's car to run in a direction selected by the player at each of said branching points which leads to one of the branched roads based on the operation signal from the. operation means;
   rival car control means for controlling the running of a rival car on the road;

display processing means for displaying an image of the game space within a field of view set in advance;

a traffic light provided at least one of said branching points;

traffic control means for controlling the traffic light; and general car control means for controlling the running of general cars on the road in accordance with the traffic light.

9. A driving game machine according to claim 8, wherein the branching points include crossroads formed by intersecting branched roads.

10. A driving game machine according to claim 8, wherein the branched roads include main branched roads forming the running course from the start point to the goal point and auxiliary branched roads branched off from the main branched roads.

11. A computer readable storage medium storage medium storing a driving-game program which causes a computer to execute a procedure that a player's car simulatively runs on a road set within a game space in accordance with an operation signal from operation means operable by a player, and an image of the game space within a predetermined field of view is displayed on the display monitor, the road including a start point and a goal point which defines a running course which has branched roads at branching points located in intermediate positions therealong, the driving game program comprising executable code for execution by a computer processor causing said computer processor to perform the step of:

controlling the player's car to run at each branching point which leads to one of the branched roads in a direction in accordance with an operation signal from the operation means;

displaying a traffic light at at least one said branching points;

controlling the traffic light; and controlling the running of general cars on the road in accordance with the traffic light.

12. A driving game machine comprising:

operation means for generating an operation signal in accordance with a player's operation;

road data storage means for storing coordinate data of a road set in a game space, the road having a start point and a goal point, a running course from the start point to the goal point including branched roads at branching points located in intermediate positions therealong, and a traffic light which is provided at at least one of the branching points;

player's car control means for controlling the running of a player's car on the road in accordance with an operation signal from the operation means, said player's car control means causing the player's car to run in a direction selected by the player at each of said branching points which leads to one of the branched roads based on the operation signal from the operation means;

display processing means for displaying an image of the game space within a field of view set in advance;

traffic control means for controlling the traffic light; and general car control for controlling the running of general cars on the road, the general car control means causing the general cars to run on a predetermined course including branched roads and enables the running course of the genera; cars to be changed at the branching points when a predetermined condition is satisfied, and causing the general cars to run on the roads in accordance with the traffic light.

* * * * *